US006344515B1

(12) United States Patent
Parikh et al.

(10) Patent No.: US 6,344,515 B1
(45) Date of Patent: *Feb. 5, 2002

(54) COMPOSITIONS COMPRISING A SUBSTANTIALLY RANDOM INTERPOLYMER OF AT LEAST ONE α-OLEFIN AND AT LEAST ONE VINYLIDENE AROMATIC MONOMER OR HINDERED ALIPHATIC VINYLIDENE MONOMER

(75) Inventors: Deepak R. Parikh; Martin Guest, both of Lake Jackson, TX (US); David R. Speth, Midland, MI (US)

(73) Assignee: The Dow Chemical Company, Midland, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/923,191

(22) Filed: Sep. 4, 1997

Related U.S. Application Data

(60) Provisional application No. 60/025,622, filed on Sep. 4, 1996.

(51) Int. Cl.$^7$ ............................................... C08L 23/08
(52) U.S. Cl. ...................... 524/578; 524/274; 524/296; 524/553; 524/577; 156/334; 526/347
(58) Field of Search ................................ 524/577, 578, 524/274, 296, 553; 428/461, 523; 156/334; 526/347

(56) References Cited

U.S. PATENT DOCUMENTS

| | | | |
|---|---|---|---|
| 3,645,992 A | | 2/1972 | Elston |
| 4,798,081 A | | 1/1989 | Hazlitt et al. |
| 5,055,438 A | | 10/1991 | Canich |
| 5,057,475 A | | 10/1991 | Canich et al. |
| 5,064,802 A | | 11/1991 | Stevens et al. |
| 5,089,321 A | | 2/1992 | Chum et al. |
| 5,096,867 A | | 3/1992 | Canich |
| 5,132,380 A | | 7/1992 | Stevens et al. |
| 5,189,192 A | | 2/1993 | LaPointe et al. |
| 5,244,996 A | * | 9/1993 | Kawasaki et al. .......... 526/347 |
| 5,272,236 A | | 12/1993 | Lai et al. |
| 5,278,272 A | | 1/1994 | Lai et al. |
| 5,321,106 A | | 6/1994 | LaPointe |
| 5,347,024 A | | 9/1994 | Nickias |
| 5,350,723 A | | 9/1994 | Neithamer et al. |
| 5,374,696 A | | 12/1994 | Rosen et al. |
| 5,399,635 A | | 3/1995 | Neithamer et al. |
| 5,460,818 A | | 10/1995 | Park et al. |
| 5,475,075 A | * | 12/1995 | Brant et al. .......... 526/348.1 X |
| 5,530,054 A | * | 6/1996 | Tse et al. ................. 524/570 X |
| 5,548,014 A | * | 8/1996 | Tse et al. .................... 524/477 |
| 5,874,512 A | * | 2/1999 | Farley et al. ........... 526/160 X |

FOREIGN PATENT DOCUMENTS

| | | |
|---|---|---|
| EP | 416815 | 8/1990 |
| EP | 514828 | 5/1992 |
| EP | 520732 | 6/1992 |
| GB | 2032439 A | 8/1979 |
| JP | 07/278230 | 10/1995 |
| WO | WO94/00500 | 1/1994 |
| WO | WO95/32095 | 11/1995 |
| WO | WO97/33921 | 3/1997 |
| WO | WO97/33921 | 9/1997 |
| WO | WO98/09999 | 3/1998 |

OTHER PUBLICATIONS

Hackh's Chem. Dictionary, (4th ed.), McGraw–Hill, N.Y., 1969, p. 472.*

D'Anniello et al., *Journal of Applied Polymer Science,* vol. 58, pp. 1701–1706 (1995).

Williams et al., Journal of Polymers Science, *Polymer Letters,* vol. 6, p. 621, 1968.

Testing Machine, Inc., New York, in accordance with ASTM–D2979–71.

J. C. Randell, *Polymer Sequence Determination, Carbon–13 NMR Method,* Academic Press New York, p. 71–78, 1977.

*Plastics Technology,* p. 25, Sep. 1992.

Longo et al., *Makromol. Chem.,* vol. 191, pp. 2387–2396, 1990.

Xu et al., *Polymer Printouts, Am. Chem. Soc. Div. Polym. Chem.,* vol. 35, pp. 686–687, 1994.

Lu et al., *Journal of Applied Polymer Science,* vol. 53, pp. 1453–1460, 1994.

Simons et al., *Adhesives Age,* "The HMDA Concept: A New Method for Selection of Resins", Nov. 1996.

Wild et al., *Journal of Polymer Science, Poly. Phys. Ed.,* vol. 20, pp. 441–455, 1982.

(List continued on next page.)

*Primary Examiner*—Fred Teskin

(57) ABSTRACT

Disclosed are compositions comprising at least one substantially random interpolymer of ethylene and a vinylidene aromatic monomer or a hindered aliphatic vinylidene monomer and optionally at least one $C_3$–$C_{20}$ α-olefin monomer, and at least one tackifier. The claimed compositions are useful in adhesives, such as are employed in various applications, such as in packaging and carton sealing, bookbinding, masking tape, clear office tape, labels, decals, bandages, decorative and protective sheets (such as shelf and drawer liners), floor tiles, sanitary napkin/incontinence device placement strips, sun control films, and the joining of gaskets to automobile windows. The claimed compositions further find use in a variety of applications, such as sealants, coatings, molded articles, and multilayered structures.

9 Claims, No Drawings

OTHER PUBLICATIONS

Randell, *Rev. Macromol. Chem. Phys.*, C29 (2&3), pp. 285–297.

Zimm et al., *J. Chem. Phys.*, vol. 17, p. 1301, 1949.

Rudin, *Modern Methods of Polymer Characterization*, John Wiley & Sons, New York, pp. 103–112, 1991.

A. Willem deGroot and P. Steve Chum, both of The Dow Chemical Company, conference of the Federation of Analytical Chemistry and Spectroscopy Society (FACSS) in St. Louis, Oct. 4, 1994.

J. Class et al., *Handbook of Pressure Sensitive Adhesive Technology*, Second Edition, D. Satas, e., pp. 158–204, 1989.

English language translation of Japanese patent disclosure No. 7–278230, Oct. 1995.*

* cited by examiner

COMPOSITIONS COMPRISING A SUBSTANTIALLY RANDOM INTERPOLYMER OF AT LEAST ONE α-OLEFIN AND AT LEAST ONE VINYLIDENE AROMATIC MONOMER OR HINDERED ALIPHATIC VINYLIDENE MONOMER

This application claims priority under 35 U.S.C. section 119(e) to Provisional Application No. 60/025,622, filed Sep. 4, 1996.

The subject invention pertains to olefin-based compositions. In particular, the subject invention pertains to compositions comprising at least one substantially random interpolymer of at least one α-olefin and a vinylidene aromatic monomer or a hindered aliphatic vinylidene monomer, preferably at least one substantially random interpolymer of ethylene, optionally at least one α-olefin and a vinylidene aromatic monomer, in conjunction with at least one tackifier, and optionally at least one extending or modifying composition or processing aid.

Substantially random interpolymers of at least one α-olefin and a vinylidene aromatic monomer or a hindered aliphatic vinylidene monomer, including materials such as α-olefin/vinyl aromatic monomer interpolymers, are known in the art and offer a range of material structures and properties which makes them useful for varied applications, such as compatibilizers for blends of polyethylene and polystyrene as described in U.S. Pat. No. 5,460,818.

One particular aspect described by D'Anniello et al. (Journal of Applied Polymer Science, Volume 58, pages 1701–1706 [1995]) is that such interpolymers can show good elastic properties and energy dissipation characteristics. In another aspect, selected interpolymers can find utility in adhesive systems, as illustrated in U.S. Pat. No. 5,244,996, issued to Mitsui Petrochemical Industries Ltd.

Although of utility in their own right, the industry seeks to improve the applicability of these substantially random interpolymers. For example, it may be desirable in certain instances to manipulate the glass transition temperature of the substantially random interpolymer, and thus allow materials based on substantially random interpolymers to find application, for example, in molded articles and as sealants and adhesives.

The glass transition temperature of a polymer is one of the major physical parameters that determines its mechanical properties. Below the glass transition temperature, polymers are commonly stiff load bearing rigid plastics. Above the glass transition temperature, materials exhibit more rubbery behavior. When the glass transition temperature is in the range of room temperature, the properties observed for the polymer may change depending on the ambient conditions. It is therefore advantageous to be able to control the glass transition temperature of a polymer to achieve the desired property profile.

For instance, in the case of substantially random interpolymers which have a glass transition temperature of about −25 to about 25° C., it would be desirable in certain instances to raise the glass transition temperature. For instance, substantially random interpolymers having a glass transition temperature at about ambient temperature are susceptible to detrimental blocking. Further, when the glass transition temperature is about ambient temperature, the product properties will vary, depending on the actual temperature, which leads to an undesired product variance. Further, when the glass transition temperature is at ambient temperature, optimized utility in certain applications, such as in pressure sensitive adhesives, is desired.

One way to control the glass transition temperature of a copolymer is to change the type of comonomer and the amount of it present in the copolymer. For instance, this approach is employed for controlling the glass transition temperature of acrylic copolymers.

An alternative to varying comonomer content is to add to a base material another material having a different glass transition temperature. However, it is known that the addition of a low molecular weight brittle diluent, while it may increase the glass transition temperature, will typically lead to a degradation in mechanical properties, such as tensile strength. It was expected that the addition of the class of materials commonly described as tackifiers to substantially random interpolymers, particularly those interpolymers which are elastomeric, would dilute the polymer network and lead to tensile properties, that is, tensile strength at break and elongation at break, which are less than the substantially random interpolymer alone.

There is a need to provide compositions comprising substantially random interpolymers of at least one α-olefin and at least one vinylidene aromatic or hindered aliphatic monomer which have an increased glass transition temperature over unmodified substantially random interpolymers, particularly which have a glass transition temperature greater than room temperature. There is a need for such a composition which is attained without a corresponding loss in tensile properties. There is a need to provide improved hot melt adhesive formulations comprising substantially random interpolymers of at least one α-olefin and at least one vinylidene aromatic or hindered aliphatic monomer which accords superior performance characteristics to the unmodified polymers, which will further expand the utility of this interesting class of materials.

Hot melt adhesives generally comprise three components: a polymer, a tackifier, and a wax. Each component may comprise a blend of two or more components, that is, the polymer component may comprise a blend of two different polymers. The polymer provides cohesive strength to the adhesive bond. The tackifier provides tack to the adhesive which serves to secure the items to be bonded while the adhesive sets, and reduces the viscosity of the system making the adhesive easier to apply to the substrate. The tackifier may be further used to control the glass transition temperature of the formulation. The wax shortens the open/close times and reduces the viscosity of the system. Hot melt adhesives may further typically comprise oil as a filler and/or to reduce the viscosity of the system.

Hot melt adhesives based on previously used polymers include ethylene vinyl acetate copolymers (EVA), a tactic polypropylene (APP), amorphous polyolefins, low density polyethylene (LDPE), and homogeneous linear ethylene/α-olefin copolymers. Prior art hot melt adhesives typically employed large levels of tackifier to reduce the viscosity of the system to levels which enabled its facile application to the substrate, for instance, to viscosities less than about 5000 centipoise.

Pressure sensitive adhesives are materials which are aggressively and permanently tacky at room temperature at the time of application, and which firmly adhere to a variety of dissimilar surfaces with the application of light pressure, such as pressing with a finger. Despite their aggressive tackiness, pressure sensitive adhesives may be removed from smooth surfaces without leaving significant residue. Pressure sensitive adhesives are widely used in everyday applications, such as masking tape, clear office tape, labels, decals, bandages, decorative and protective sheets (such as shelf and drawer liners), floor tiles, sanitary napkin/ incontinence device placement strips, sun control films, and the joining of gaskets to automobile windows.

Historically, pressure sensitive adhesives were based on natural rubber and wood rosins, which were carried by a solvent. Articles bearing such adhesives were manufactured by applying a solution of the adhesive on a suitable backing, and removing the solvent by a devolatilizing process. However, in response to cost increases in solvents and regulatory restrictions regarding emissions, water-based adhesives and solid-form hot melt adhesives (HMA's) have been developed.

Historically, adhesives have been based on one of four types of polymers: elastomers (such as natural rubber, styrene-isoprene-styrene block copolymers, styrene-butadiene-styrene block copolymers, and styrene-butadiene random copolymers); acrylics (such as interpolymers of butyl acrylate, 2-ethyl hexyl acrylate, and methyl methacrylate); hydrocarbons (such as a tactic polypropylene, amorphous polypropylene, poly-1-butene, and low density polyethylene); and ethylene vinyl acetate. More recently, hot melt adhesives based on homogeneous linear and substantially linear ethylene polymers have been disclosed and claimed.

Diene-based elastomers may be utilized in solvent-based, water-born, and hot melt adhesives. However, adhesive systems based on such elastomers are disadvantageous in that the sites of unsaturation in the block copolymer backbone make the hot melt adhesive susceptible to degradation by the action of oxygen and ultraviolet light.

Acrylic systems, while stable to oxygen and ultraviolet light, are inferior to diene-based elastomer systems in terms of the balance of tack, peel and creep resistance which is preferred for pressure sensitive adhesive applications. Further, such systems are typically available only in the solvent-based and water-borne systems, making them further disadvantageous for the reasons set forth above.

Hydrocarbon-based systems were developed at least in part to provide improved stability to oxygen and ultraviolet light, as compared to diene-based elastomer systems, as well as the ability to be utilized in hot melt adhesive systems. Hydrocarbon-based systems which comprise, atactic polypropylene, interpolymers of propylene with higher order α-olefins, or poly-α-olefins, such systems exhibit a poor balance of properties. In particular, poly-1-butene has a tendency to slowly crystallize after application to the substrate, leading to a profound loss of tack. When oil is added to increase tack, the oil tends to migrate out of the adhesive into the backing layer or the substrate. Atactic polypropylene and poly-α-olefins suffer from low tensile strength, which leads to low cohesive strength on peel and to the leaving of a residue on the substrate surface after peeling. Hydrocarbon-based systems are typically not preferred due to the limited ability of low density polyethylene to accept the formulation ingredients required to produce a hot melt adhesive with suitable mechanical properties.

Ethylene vinyl acetate based systems are limited in that as higher vinyl acetate levels are selected, elastic performance increases, but compatibility with formulation ingredients decreases.

Hot melt adhesives based on homogeneous linear ethylene/α-olefin copolymers are disclosed in U.S. Pat. No. 5,530,054. Preferred hot melt adhesives based on homogeneous linear and substantially linear ethylene/α-olefin interpolymers are disclosed in U.S. Ser. No. 08/616,406, entitled "Olefin Polymer Blends for Hot Melt Adhesives", filed on Mar. 15, 1996 in the names of Parikh et al., and U.S. Ser. No. 08/615,750, entitled "Adhesives Comprising Olefin Polymers", filed on Mar. 14, 1996, in the names of Simmons, et. al., the disclosures of which are incorporated herein by reference. While these preferred hot melt adhesives are advantageous, industry is continually in need of alternate adhesive systems.

The subject invention pertains to a composition comprising at least one substantially random interpolymer of ethylene and a vinylidene aromatic comonomer or a hindered aliphatic vinylidene comonomer and optionally at least one third comonomer selected from the group consisting of $C_3$–$C_{20}$ α-olefins, and at least one tackifier. The subject invention further pertains to a composition comprising at least one substantially random interpolymer of ethylene and a vinylidene aromatic comonomer or a hindered aliphatic vinylidene comonomer and optionally at least one third comonomer selected from the group consisting of $C_3$–$C_{20}$ α-olefins, and at least one tackifier, and at least one extending or modifying composition or processing aid. The subject invention further pertains to such a composition, wherein the extending or modifying composition is selected from the group consisting of the following: paraffinic waxes, crystalline polyethylene waxes, styrene block copolymers, ethylene vinyl acetate, polymers or interpolymers of styrene and/or alkyl-substituted styrene, such as α-methyl styrene, and homogeneous linear or substantially linear interpolymers of ethylene and one or more $C_3$–$C_{20}$ α-olefins. The subject invention further pertains to such a composition in the form of an adhesive, a layer of a multilayer food packaging structure, a coating, a sealant, a molded article, or a sound attenuating device.

Unless indicated otherwise, the following testing procedures are to be employed:

Density is measured in accordance with ASTM D-792. The samples are annealed at ambient conditions for 24 hours before the measurement is taken.

Melt index ($I_2$), is measured in accordance with ASTM D-1238, condition 190° C./2.16 kg (formally known as "Condition (E)").

Molecular weight is determined using gel permeation chromatography (GPC) on a Waters 150° C. high temperature chromatographic unit equipped with three mixed porosity columns (Polymer Laboratories 103, 104, 105, and 106), operating at a system temperature of 140° C. The solvent is 1,2,4-trichlorobenzene, from which 0.3 percent by weight solutions of the samples are prepared for injection. The flow rate is 1.0 mL/min. and the injection size is 100 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Word in Journal of Polymer Science, Polymer Letters, Vol. 6, (621) 1968, incorporated herein by reference) to derive the following equation:

$$M_{polyethylene} = a^* (M_{polystyrene}) b.$$

In this equation, a=0.4316 and b=1.0. Weight average molecular weight, $M_w$, is calculated in the usual manner according to the following formula: $M_w = \Sigma w_i * M_i$, where $w_i$ and $M_i$ are the weight fraction and molecular weight, respectively, of the ith fraction eluting from the GPC column.

Melt viscosity is determined in accordance with the following procedure using a Brookfield Laboratories DVII+ Viscometer in disposable aluminum sample chambers. The spindle used is a SC-31 hot-melt spindle, suitable for measuring viscosities in the range of from 10 to 100,000 centipoise. A cutting blade is employed to cut samples into pieces small enough to fit into the 1 inch wide, 5 inches long sample chamber. The sample is placed in the chamber, which is in turn inserted into a Brookfield Thermosel and locked into place with bent needle-nose pliers. The sample chamber has a notch on the bottom that fits the bottom of the Brookfield Thermosel to ensure that the chamber is not allowed to turn when the spindle is inserted and spinning. The sample is heated to 350° F., with additional sample being added until the melted sample is about 1 inch (2.54 cm) below the top of the sample chamber. The viscometer apparatus is lowered and the spindle submerged into the sample chamber. Lowering is continued until brackets on the viscometer align on the Thermosel. The viscometer is turned on, and set to a shear rate which leads to a torque reading in the range of 30 to 60 percent. Readings are taken every minute for about 15 minutes, or until the values stabilize, which final reading is recorded.

G', G", and peak tan delta are determined as follows. The samples are examined using melt rheology techniques on a Rheometrics RDA-II Dynamic Analyzer. The Temperature-Step mode is used utilizing the 7.9 mm diameter parallel plates geometry. The sweep is run from approximately −70° C. to 250° C. at 5° C. per step with 30 seconds equilibration delay at each step. The oscillatory frequency is 1 radian/second with an autostrain function of 0.1 percent strain initially, increasing in positive 100 percent adjustments whenever the torque decreased to 10 gram-centimeters. The plates are used with an initial gap of 1.5 mm at 160° C. The samples are maintained in a nitrogen environment throughout the analyses to minimize oxidative degradation. A plot of G' (the dynamic storage modulus of the sample), G" (the dynamic loss modulus of the sample), tan delta (G'/G"), and peak tan delta (a representation of the glass transition temperature, are plotted.

Glass transition temperature (DSC) is determined using differential scanning calorimetry, with a scan rate of 10° C./minute from −75 to 150° C.

Probe tack is determined using a Digital Polyken Probe Tack Tester TMI 80-02-01 (available from Testing Machines, Inc., (New York)), in accordance with ASTM-D2979-71.

The term "interpolymer" is used herein to indicate a copolymer, or a terpolymer, or the like. That is, at least one other comonomer is polymerized with ethylene to make the interpolymer.

The term "hydrocarbyl" means any aliphatic, cycloaliphatic, aromatic, aryl substituted aliphatic, aryl substituted cycloaliphatic, aliphatic substituted aromatic, or cycloaliphatic substituted aromatic groups. The aliphatic or cycloaliphatic groups are preferably saturated. Likewise, the term "hydrocarbyloxy" means a hydrocarbyl group having an oxygen linkage between it and the carbon atom to which it is attached.

The term "substantially random" in the substantially random interpolymer comprising an α-olefin and a vinylidene aromatic monomer or hindered aliphatic vinylidene monomer as used herein means that the distribution of the monomers of said interpolymer can be described by the Bernoulli statistical model or by a first or second order Markovian statistical model, as described by J. C. Randall in *Polymer Sequence Determination, Carbon-13 NMR Method,* Academic Press New York, 1977, pp. 71–78. Preferably, the substantially random interpolymer comprising an α-olefin and a vinylidene aromatic monomer does not contain more than 15 percent of the total amount of vinylidene aromatic monomer in blocks of vinylidene aromatic monomer of more than 3 units. More preferably, the interpolymer is not characterized by a high degree of either isotacticity or syndiotacticity. This means that in the 13C-NMR spectrum of the substantially random interpolymer the peak areas corresponding to the main chain methylene and methine carbons representing either meso diad sequences or racemic diad sequences should not exceed 75 percent of the total peak area of the main chain methylene and methine carbons.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure and time is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The interpolymers suitable for use as, or as components in, the compositions of the invention, include, but are not limited to, interpolymers prepared by polymerizing one or more α-olefins with one or more vinylidene aromatic monomers and/or one or more hindered aliphatic vinylidene monomers, with interpolymers of ethylene, one or more vinylidene aromatic monomers, and optionally one or more α-olefins, being preferred.

Suitable α-olefins include for example, those containing from 2 to about 20, preferably from 2 to about 12, more preferably from 2 to about 8 carbon atoms. Particularly suitable are ethylene, propylene, butene-1,4-methyl-1-pentene, hexene-1 and octene-1. Other suitable α-olefin monomers include norbornenes.

Suitable vinylidene aromatic monomers include, for example, those represented by the following formula:

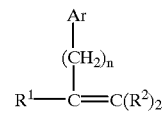

wherein $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; Ar is a phenyl group or a phenyl group substituted with from 1 to 5 substituents selected from the group consisting of halo, $C_{1-4}$-alkyl, and $C_{1-4}$-haloalkyl; and n has a value from zero to about 6, preferably from zero to about 2, more preferably zero. Exemplary monovinylidene aromatic monomers include styrene, vinyl toluene, α-methylstyrene, t-butyl styrene, chlorostyrene, including all isomers of these compounds. Particularly suitable such monomers include styrene and lower alkyl- or halogen-substituted derivatives thereof. Preferred monomers include styrene, α-methyl styrene, the lower alkyl- or phenyl-ring substituted derivatives of styrene, such as ortho-, meta-, and para-methylstyrene, the ring halogenated styrenes, para-vinyl toluene or mixtures thereof. A more preferred monovinylidene aromatic monomer is styrene.

The term "hindered aliphatic or cycloaliphatic vinylidene monomers" means addition polymerizable vinylidene monomers corresponding to the following formula:

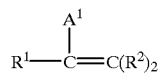

wherein and $A^1$ is a sterically bulky, aliphatic substituent of up to 20 carbons, $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; or alternatively $R^1$ and Al together form a ring system. By the term "sterically bulky" is meant that the monomer bearing this substituent is normally incapable of addition polymerization by standard Ziegler-Natta polymerization catalysts at a rate comparable with ethylene polymerizations. Preferred hindered aliphatic or cycloaliphatic vinylidene monomers are those in which one of the carbon atoms bearing ethylenic unsaturation is tertiary or quaternary substituted. Examples of such substituents include cyclic aliphatic groups such as cyclohexyl, cyclohexenyl, cyclooctenyl, or ring alkyl or aryl substituted derivatives thereof, tert-butyl, and norbornyl. Most preferred hindered aliphatic vinylidene compounds are the various isomeric vinyl-ring substituted derivatives of cyclohexene and substituted cyclohexenes, and 5-ethylidene-2-norbornene. Especially suitable are 1-, 3-, and 4-vinylcyclohexene.

The interpolymers of one or more α-olefins and one or more monovinylidene aromatic monomers and/or one or more hindered aliphatic or cycloaliphatic vinylidene monomers employed in the present invention are substantially random polymers. These interpolymers usually contain from about 1 to about 65 mole percent of at least one vinylidene aromatic monomer and/or hindered aliphatic or cycloaliphatic vinylidene monomer and from about 35 to about 99 mole percent of at least one aliphatic α-olefin having from 2 to about 20 carbon atoms. When the substantially random interpolymer has from 1 to less than 5 mole percent of the at least one vinylidene aromatic monomer and/or hindered aliphatic or cycloaliphatic vinylidene monomer, the substantially random interpolymer will impart a crystalline character to the adhesive system. When the substantially random interpolymer has from 5 to less than 25 mole percent of the at least one vinylidene aromatic monomer and/or hindered aliphatic or cycloaliphatic vinylidene monomer, the substantially random interpolymer will impart an elastomeric character to the adhesive system. When the substantially random interpolymer has from 25 to 50 mole percent of the at least one vinylidene aromatic monomer and/or hindered aliphatic or cycloaliphatic vinylidene monomer, the substantially random interpolymer will impart an amorphous character to the adhesive system.

When the substantially random interpolymer is used as the strength imparting component of an adhesive, the number average molecular weight (Mn) of these interpolymers is usually greater than about 1,000, preferably from about 5,000 to about 1,000,000, more preferably from about 10,000 to about 500,000, and most preferably from about 50,000 to about 300,000. As described below, ultra-low molecular weight ethylene polymers, one class of which includes ultra-low molecular weight interpolymers of ethylene and at least one vinylidene aromatic monomer and/or hindered aliphatic or cycloaliphatic vinylidene monomer, may suitably be employed in the practice of this invention, if not as the strength-imparting component of the formulation, then as tackifiers or modifiers.

While preparing the substantially random interpolymers, as will be described hereinafter, an amount of a tactic vinylidene aromatic homopolymer may be formed due to homopolymerization of the vinylidene aromatic monomer at elevated temperatures. In general, the higher the polymerization temperature was, the higher is the amount of homopolymer formed. The presence of vinylidene aromatic homopolymer is in general not detrimental for the purposes of the present invention and may be tolerated. The vinylidene aromatic homopolymer may be separated from the interpolymer, if desired, by extraction techniques such as selective precipitation from solution with a non solvent for either the interpolymer or the vinylidene aromatic homopolymer. For the purpose of the present invention it is preferred that no more than 20 weight percent, preferably less than 15 weight percent, more preferably less than 10 weight percent, based on the total weight of the interpolymers of vinylidene aromatic homopolymer is present.

The substantially random interpolymers may be modified by typical grafting, hydrogenation, functionalizing, or other reactions well known to those skilled in the art. The polymers may be readily sulfonated or chlorinated to provide functionalized derivatives according to established techniques.

The substantially random interpolymers are prepared by polymerizing a mixture of polymerizable monomers in the presence of metallocene or constrained geometry catalysts.

The substantially random interpolymers can be prepared as described in U.S. application Ser. No. 545,403 filed Jul. 3, 1990 (corresponding to EP-A-0,416,815) by James C. Stevens et al., both of which are incorporated herein by reference. Preferred operating conditions for such polymerization reactions are pressures from atmospheric up to 3000 atmospheres (300 MPa) and temperatures from −30° C. to 200° C.

Examples of suitable catalysts and methods for preparing the substantially random interpolymers are disclosed in EP-A-416,815; EP-A-514,828; EP-A-520,732; U.S. application Ser. No. 241,523, filed May 12, 1994, now U.S. Pat. No. 5,470,993; as well as U.S. Pat. Nos.: 5,055,438; 5,057,475; 5,096,867; 5,064,802; 5,132,380; 5,189,192; 5,321,106; 5,347,024; 5,350,723; 5,374,696; and 5,399,635, all of which are incorporated herein by reference.

The substantially random α-olefin/vinylidene aromatic interpolymers can also be prepared by the methods described by John G. Bradfute et al. (W. R. Grace & Co.) in WO 95/32095; by R. B. Pannell (Exxon Chemical Patents, Inc.) in WO 94/00500; and in *Plastics Technology*, p. 25 (September 1992), all of which are incorporated by reference in their entirety.

The substantially random α-olefin/vinylidene aromatic interpolymers can also be prepared by the methods described in JP 07/278230 employing compounds shown by the general formula

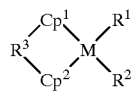

where (Cp$^1$ and Cp$^2$ are cyclopentadienyl groups, indenyl groups, fluorenyl groups, or substituents of these, independently of each other; R$^1$ and R$^2$ are hydrogen atoms, halogen atoms, hydrocarbon groups with carbon numbers of 1–12, alkoxyl groups, or aryloxyl groups, independently of each other; M is a group IV metal, preferably Zr or Hf, most preferably Zr; and R$^3$ is an alkylene group or silanediyl group used to cross-link Cp$^1$ and Cp$^2$).

Also suitable are the substantially random interpolymers which possess at least one α-olefin/vinyl aromatic/vinyl aromatic/α-olefin tetrad disclosed in a copending application by Jasson T. Patton et al., entitled "New α-olefin/Vinylidene Aromatic Monomer and/or Hindered Aliphatic or Cycloaliphatic Vinylidene Monomer Interpolymers, filed on Sep. 4, 1996, incorporated herein by reference. These interpolymers contain additional signals with intensities greater than three times the peak to peak noise. These signals appear in the chemical shift range 43.75–44.25 ppm and 38.0–38.5 ppm. Specifically, major peaks are observed at 44.1, 43.9 and 38.2 ppm. A proton test NMR experiment indicates that the signals in the chemical shift region 43.75–44.25 ppm are methine carbons and the signals in the region 38.0–38.5 ppm are methylene carbons.

In order to determine the carbon-13 NMR chemical shifts of these interpolymers, the following procedures and conditions are employed. A five to ten weight percent polymer solution is prepared in a mixture consisting of 50 volume percent 1,1,2,2-tetrachloroethane-d$_2$ and 50 volume percent 0.10 molar chromium tris(acetylacetonate) in 1,2,4-trichlorobenzene. NMR spectra are acquired at 130° C. using an inverse gated decoupling sequence, a 90° pulse width and a pulse delay of five seconds or more. The spectra are referenced to the isolated methylene signal of the polymer assigned at 30.000 ppm.

It is believed that these new signals are due to sequences involving two head-to-tail vinyl aromatic monomer preceded and followed by at least one α-olefininsertion, for example an ethylene/styrene/styrene/ethylene tetradwherein the styrene monomer insertions of said tetrads occur exclusively in a 1,2 (head to tail) manner. It is understood by one skilled in the art that for such tetrads involving a vinyl aromatic monomer other than styrene and an α-olefin other than ethylene that the ethylene/vinyl aromatic monomer/vinyl aromatic monomer/ethylene tetrad will give rise to similar carbon-13 NMR peaks but with slightly different chemical shifts.

These interpolymers are prepared by conducting the polymerization at temperatures of from about –30° C. to about 250° C. in the presence of such catalysts as those represented by the formula

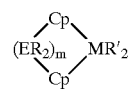

wherein: each Cp is independently, each occurrence, a substituted cyclopentadienyl group π-bound to M; E is C or Si; M is a group IV metal, preferably Zr or Hf, most preferably Zr; each R is independently, each occurrence, H, hydrocarbyl, silahydrocarbyl, or hydrocarbylsilyl, containing up to about 30 preferably from 1 to about 20 more preferably from 1 to about 10 carbon or silicon atoms; each R' is independently, each occurrence, H, halo, hydrocarbyl, hyrocarbyloxy, silahydrocarbyl, hydrocarbylsilyl containing up to about 30 preferably from 1 to about 20 more preferably from 1 to about 10 carbon or silicon atoms or two R' groups together can be a C$_{1-10}$ hydrocarbyl substituted 1,3-butadiene; m is 1 or 2; and optionally, but preferably in the presence of an activating cocatalyst. Particularly, suitable substituted cyclopentadienyl groups include those illustrated by the formula:

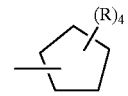

wherein each R is independently, each occurrence, H, hydrocarbyl, silahydrocarbyl, or hydrocarbylsilyl, containing up to about 30 preferably from 1 to about 20 more preferably from 1 to about 10 carbon or silicon atoms or two R groups together form a divalent derivative of such group. Preferably, R independently each occurrence is (including where appropriate all isomers) hydrogen, methyl, ethyl, propyl, butyl, pentyl, hexyl, benzyl, phenyl or silyl or (where appropriate) two such R groups are linked together forming a fused ring system such as indenyl, fluorenyl, tetrahydroindenyl, tetrahydrofluorenyl, or octahydrofluorenyl.

Particularly preferred catalysts include, for example, racemic-(dimethylsilanediyl(2-methyl-4-phenylindenyl)) zirconium dichloride, racemic-(dimethylsilanediyl(2-methyl-4-phenyl-indenyl))zirconium 1,4-diphenyl-1,3-butadiene, racemic-(dimethylsilanediyl(2-methyl-4-phenylindenyl))zirconium di-C$_{1-4}$ alkyl, racemic-(dimethylsilanediyl(2-methyl-4-phenylindenyl))zirconium di-C$_{1-4}$ alkoxide, or any combination thereof.

Further preparative methods for the substantially random interpolymer have been described in the literature. Longo and Grassi (*Makromol. Chem.*, Volume 191, pages 2387 to 2396 [1990]) and D'Anniello et al. (Journal of Applied Polymer Science, Volume 58, pages 1701–1706 [1995]) reported the use of a catalytic system based on methylalumoxane (MAO) and cyclopentadienyltitanium trichloride (CpTiCl$_3$) to prepare an ethylene-styrene copolymer. Xu and Lin (*Polymer Preprints, Am.Chem.Soc.,Div. Polym. Chem.*) Volume 35, pages 686,687 [1994]) have reported copolymerization using a TiCl$_4$/NdCl$_3$/Al(iBu)$_3$ catalyst to give random copolymers of styrene and propylene. Lu et al (*Journal of Applied Polymer Science,* Volume 53, pages 1453 to 1460 [1994]) have described the copolymerization of ethylene and styrene using a TiCl$_4$/NdCl$_3$/MgCl$_2$/Al(Et)$_3$ catalyst. The manufacture of α-olefin/vinyl aromatic monomer interpolymers such as propylene/styrene and butene/styrene are described in U.S. Pat. No. 5,244,996, issued to Mitsui Petrochemical Industries Ltd. All of the above methods disclosed for preparing the substantially random interpolymer are incorporated herein by reference.

The polymerization may be carried out in solution, slurry, or gas phase polymerization reactions. Further, the polymerization may be carried out as a batchwise or a continuous polymerization process. In a continuous process, ethylene, vinylidene aromatic monomer or hindered aliphatic vinylidene monomer, and solvent and the optional propylene or alternate third monomer are continuously supplied to the reaction zone and polymer product continuously removed therefrom.

In general, the substantially random interpolymer may be polymerized at conditions for Ziegler-Natta or Kaminsky-Sinn type polymerization reactions, that is, reactor pressures ranging from atmospheric to 3500 atmospheres (350 MPa). The reactor temperature will typically be from −30° C.–200° C. Preferably, the reactor temperature will be greater than 80° C., typically from 100° C. to 200° C., and preferably from 100° C. to 150° C., with temperatures at the higher end of the range, that is, temperatures greater than 100° C. favoring the formation of lower molecular weight polymers. Polymerizations at temperatures above the autopolymerization temperature of the respective monomers may result in the formation of some amounts of homopolymer polymerization products resulting from free radical polymerization.

In the case of a slurry polymerization process, the substantially random interpolymer may use the catalysts as described above as supported in an inert support, such as silica. As a practical limitation, slurry polymerizations take place in liquid diluents in which the polymer product is substantially insoluble. Preferably, the diluent for slurry polymerization is one or more hydrocarbons with less than 5 carbon atoms. If desired, saturated hydrocarbons such as ethane, propane or butane may be used in whole or part as the diluent. Likewise the α-olefin monomer or a mixture of different α-olefin monomers may be used in whole or in part as the diluent. Most preferably the diluent comprises in at least major part the monomer or monomers to be polymerized.

The glass transition temperature of substantially random interpolymers increases as the mole percent of the vinylidene aromatic comonomer or hindered aliphatic vinylidene comonomer increases. This suggests that by controlling the content of the vinylidene aromatic comonomer or hindered aliphatic vinylidene comonomer, one can control the tack of the adhesive system. In particular, substantially random ethylene/styrene interpolymers, comprising from 1 to less than 5 mole percent styrene will have a Tg of from approximately −15 to −20° C.; substantially random ethylene/styrene interpolymers comprising from 5 to less than 25 mole percent styrene will have a Tg of from approximately −15 to 0° C.; and substantially random ethylene/styrene interpolymers comprising at least 25 mole percent styrene will have a Tg of approximately 0 to 30° C., with Tg being determined by differential scanning calorimetry. Accordingly, ultra-low molecular weight interpolymers of ethylene and at least one vinylidene aromatic comonomer or hindered aliphatic vinylidene comonomer, may be used as an optional tackifier component of the adhesive system. Those skilled in the art will recognize that the incorporation of termonomers, such as other α-olefins, will give rise to different glass transition temperatures than those set forth above.

The subject invention further pertains to a coextruded or laminated multilayer film, in which at least one layer comprises an adhesive comprising at least one substantially random interpolymer of ethylene and vinylidene aromatic monomer or a hindered aliphatic vinylidene monomer and optionally at least one $C_3$–$C_{20}$ α-olefin monomer, wherein the adhesive is optionally adhered to a metal foil.

The subject invention further provides a tape comprising a substrate to which has been applied an adhesive comprising:

(a) from 40 to 60 weight percent of substantially random interpolymer of ethylene and vinylidene aromatic monomer or a hindered vinylidene aromatic monomer and optionally at least one $C_3$–$C_{20}$ α-olefin monomer, said substantially random interpolyhmer comprising form 25 to 65 weight percent of the vinylidene aromatic monomer or hindered aliphatic vinylidene monomer, (b) from 40 to 60 weight percent of a tacifier, (c) from 0 to 10 weight percent of a processing aid, wherein the adhesive is characterized as having a storage modulus (G') at 25° C. of from $2 \times 10^5$ to $5 \times 10^6$ dynes/cm² (0.2 to 5 Mpa).

In addition or as an alternative to adjusting the styrene content of the substantially random interpolymer, when a composition having a glass transition temperature of at least −10° C. is desired, particularly when it is desired that the composition maintain elastomeric properties, it will be preferred that such composition comprise at least one substantially random interpolymer and at least one tackifier.

As used herein, the term "tackifier" means any of several hydrocarbon based compositions useful to raise the glass transition temperature of the substantially random polymer by at least 5° C. and/or to impart tack to a hot melt adhesive which comprises the substantially random interpolymer. ASTM D-1878-61T defines tack as "the property of a material which enables it to form a bond of measurable strength immediately on contact with another surface."

Tackifying resins are obtained by the polymerization of petroleum and terpene feedstreams and from the derivatization of wood, gum, and tall oil rosin. Several classes of tackifiers include wood rosin, tall oil and tall oil derivatives, cyclopentadiene derivatives, such as are described in United Kingdom patent application GB 2,032,439A. Other classes of tackifiers include aliphatic $C_5$ resins, polyterpene resins, hydrogenated resins, mixed aliphatic-aromatic resins, rosin esters, natural and synthetic terpenes, terpene-phenolics, and hydrogenated rosin esters.

Rosin is a sold material that occurs naturally in the oleo rosin of pine trees and typically is derived from the oleo resinous exudate of the living tree, from aged stumps and from tall oil produced as a by-product of kraft paper manufacture. After it is obtained rosin can be treated by hydrogenation, dehydrogenation, polymerization, esterification, and other post treatment processes. Rosin is typically classed as a gum rosin, a wood rosin, or as a tall oil rosin which indicate its source. The materials can be used unmodified, in the form of esters of polyhydric alcohols, and can be polymerized through the inherent unsaturation of the molecules. These materials are commercially available and can be blended into the adhesive compositions using standard blending techniques. Representative examples of such rosin derivatives include pentaerythritol esters of tall oil, gum rosin, wood rosin, or mixtures thereof.

Exemplary aliphatic resins include those available under the trade designations Escorez™, Piccotac™, Mercures™, Wingtack™, Hi-Rez™, Quintone™, Tackirol™, etc. Exemplary polyterpene resins include those available under the trade designations Nirez™, Piccolyte™, Wingtack™, Zonarez™, etc. Exemplary hydrogenated resins include those available under the trade designations Escorez™, Arkon™, Clearon™, etc. Exemplary mixed aliphatic-aromatic resins include those available under the trade designations Escorez™, Regalite™, Hercures™, AR™, Imprez™, Norsolene™ M, Marukarez™, Arkon™ M, Quintone™, Wingtack™, etc. One particularly preferred class of tackifiers includes the styrene/α-methylene stryene tackifiers available from Hercules. Other tackifiers may be employed, provided they are compatible with the homogeneous linear or substantially linear ethylene/α-olefin interpolymer and the optional plasticizer.

A suitable tackifier may be selected on the basis of the criteria outlined by Hercules in J. Simons, *Adhesives Age*, "The HMDA Concept: A New Method for Selection of Resins", November 1996. This reference discusses the importance of the polarity and molecular weight of the resin in determining compatibility with the polymer. For the substantially random interpolymers useful in the practice of the claimed invention, low molecular weight polar resins are indicated to be preferred.

The tackifier(s) will typically be present in the composition of the invention in an amount of at least 10, typically at least 20 weight percent. The tackifier(s) will be present in an amount of no more than 90, preferably no more than 75, and most preferably no more than 70 weight percent.

In the case of substantially random interpolymers of at least one α-olefin and a monovinylidene aromatic monomer, preferred tackifiers will have some degree of aromatic character to promote compatibility, particularly in the case of substantially random interpolymers having a high content of the monovinylidene aromatic monomer. As an initial indicator, compatible tackifiers are those which are also known to be compatible with ethylene/vinyl acetate having 28 weight percent vinyl acetate. Particularly suitable classes of tackifiers include Wingtack™ 86 and Hercotac™ 1149 Eastman H-130, and styrene/α-methyl styrene tackifiers. Another preferred tackifier is Piccotex 75, a pure monomer hydrocarbon resin having a glass transition temperature of 33° C., available from Hercules.

It is noted that there is an unexpected benefit associated with raising the glass transition temperature of a substantially random interpolymer by addition of a compatible tackifier, in that when a compatible tackifier is utilized, not only does the glass transition temperature increase, but the tensile strength increases without a corresponding decrease in elongation at break, relative to the unmodified substantially random interpolymer. Although this effect holds true for substantially random interpolymers having both a higher and lower comonomer content, the effect is most pronounced for substantially random interpolymers having from 45–65 weight percent of the monovinylidene aromatic or hindered aliphatic comonomer, which are the most elastomeric of the substantially random interpolymers. This is contrary to what is expected, for typically, when a low molecular weight brittle solid is added to an elastomeric solid, the low molecular weight material dilutes the polymer network which leads to tensile strength and elongation at break which are less than those of the polymer alone.

Improved tensile strength has value in a number of applications, such as adhesives, elastomeric film applications, automotive parts, wire and cable jacketing, durable goods (such as appliances), gaskets, and shoe soles.

For instance, in the case of adhesive formulations, it has been found that when the glass transition temperature of the substantially random interpolymer is less than −20° C., the composition exhibits poor peel strength and tack. However, by raising the glass transition temperature to 0° C. by addition of a tackifier increases the peel strength of the formulation.

In the case of improved resistance to blocking, it is desirable to avoid bonding together or blocking of polymer pellets during transportation and storage. Thus, utilizing the compositions of the invention which comprise a substantially random interpolymer and a tackifier, such that the glass transition temperature is above the temperature during transportation and storage, will increase the stiffness of the polymer pellets, and will lead to a resistance to deformation during transportation and storage. In another embodiment, pellets of a substantially random interpolymer may be coated with a tackifier to create a surface composition which comprises the substantially random interpolymer and tackifier which minimizes blocking.

The compositions of the invention which comprise a tackifier will find further utility in sound attenuation applications. For instance, to attenuate sound, a material must be able to dissipate high levels of energy over the broad frequency range of normal sound under ambient conditions. This occurs when the glass transition temperature is from about −20 to about 10° C. Compositions of the invention which exhibit a glass transition temperature in this range, will attenuate sound in a variety of structures, such as automobiles.

Processing aids, which are also referred to herein as plasticizers, are optionally provided to reduce the viscosity of a composition, such as an adhesive, and include the phthalates, such as dioctyl phthalate and diisobutyl phthalate, natural oils such as lanolin, and paraffin, naphthenic and aromatic oils obtained from petroleum refining, and liquid resins from rosin or petroleum feedstocks.

Exemplary classes of oils useful as processing aids include white mineral oil (such as Kaydol™ oil (available from Witco), and Shellflex™ 371 naphtlienic oil (available from Shell Oil Company). Another suitable oil is Tuflo™ oil (available from Lyondell).

When a processing aid is employed, it will be present in the composition of the invention in an amount of at least 5 percent. The processing aid will typically be present in an amount of no more than 60, preferably no more than 30, and most preferably no more than 20 weight percent.

The composition comprising the substantially random interpolymer of ethylene and at least one vinylidene aromatic monomer or hindered aliphatic vinylidene monomer, and optional $C_3$–$C_{20}$ α-olefin, may be optionally modified by the inclusion of an extending or modifying composition. Exemplary extending or modifying compositions include paraffinic wax, crystalline polyethylene wax, and/or a homogeneous linear or substantially linear ethylene/α-olefin interpolymer.

Likewise, the composition of the invention may further comprise a homogeneous linear or substantially linear ethylene/α-olefin interpolymer as an extending or modifying composition. Modification of the composition with a homogeneous linear or substantially linear ethylene/α-olefin interpolymer, particularly when such interpolymer is an elastomer, will tend to extend the composition when the composition comprises a substantially random interpolymer which has a high styrene content, and to improve the tack and modulus of the adhesive when the adhesive comprises a substantially random interpolymer which has a low styrene content.

The homogeneous linear or substantially linear ethylene/α-olefin interpolymer is an ethylene polymer prepared using a single site, single site metallocene, or single site constrained geometry catalyst. By the term homogenous, it is meant that any comonomer is randomly distributed within a given interpolymer molecule and substantially all of the interpolymer molecules have the same ethylene/comonomer ratio within that interpolymer. The DSC melting peak of homogeneous linear and substantially linear ethylene polymers will broaden as the density decreases and/or as the number average molecular weight decreases. However, unlike heterogeneous polymers, when a homogeneous polymer has a melting peak greater than 115° C. (such as is the case of polymers having a density greater than 0.940 g/cm$^3$), such polymers typically do not additionally have a distinct lower temperature melting peak.

Homogeneous linear and substantially linear interpolymers useful in the invention further differ from low density polyethylene prepared in a high pressure process. In one regard, whereas low density polyethylene is an ethylene homopolymer having a density of from 0.900 to 0.935 g/cm³, the homogeneous linear and substantially linear interpolymers useful in the invention require the presence of a comonomer to reduce the density to the range of from 0.900 to 0.935 g/cm³.

The homogeneous linear and substantially linear interpolymers useful in the invention are typically characterized as having a narrow molecular weight distribution ($M_w/M_n$). For the linear and substantially linear interpolymers, the $M_w/M_n$ is typically from 1.5 to 2.5, preferably from 1.8 to 2.2.

In addition or in the alternative, the homogeneity of the polymer may be described by the SCBDI (Short Chain Branching Distribution Index) or CDBI (Composition Distribution Breadth Index), which are defined as the weight percent of the polymer molecules having a comonomer content within 50 percent of the median total molar comonomer content. The SCBDI of a polymer is readily calculated from data obtained from techniques known in the art, such as, for example, temperature rising elution fractionation (abbreviated herein as "TREF"), which is described, for example, in Wild et al., Journal of Polymer Science, Poly. Phys. Ed., Vol. 20, p. 441 (1982), in U.S. Pat. No. 4,798,081 (Hazlitt et al.), or in U.S. Pat. No. 5,089,321 (Chum et al.), the disclosures of all of which are incorporated herein by reference. The SCBDI or CDBI for the homogeneous linear and substantially linear interpolymers useful in the invention is preferably greater than 50 percent, more preferably greater than 70 percent, with SCBDI's and CDBI of greater than 90 percent being easily attained.

Substantially linear ethylene interpolymers are homogeneous interpolymers having long chain branching. Due to the presence of such long chain branching, substantially linear ethylene interpolymers are further characterized as having a melt flow ratio ($I_{10}/I_2$) which may be varied independently of the polydispersity index, also referred to as the molecular weight distribution $M_w/M_n$. This feature accords substantially linear ethylene polymers with a high degree of processability despite a narrow molecular weight distribution. When a substantially linear ethylene interpolymer is employed in the practice of the invention, such interpolymer will be characterized as having an interpolymer backbone substituted with from 0.1 to 3 long chain branches per 1000 carbons.

Methods for determining the amount of long chain branching present, both qualitatively and quantitatively, are known in the art. For qualitative methods for determining the presence of long chain branching, see, for example, U.S. Pat. Nos. 5,272,236 and 5,278,272, the disclosures of both of which are incorporated herein by reference. As set forth therein, a gas extrusion rheometer (GER) may be used to determine the rheological processing index (PI), the critical shear rate at the onset of surface melt fracture, and the critical shear stress at the onset of gross melt fracture, which in turn indicate the presence or absence of long chain branching as set forth below.

For quantitative methods for determining the presence of long chain branching, see, for example, U.S. Pat. Nos. 5,272,236 and 5,278,272; Randall (Rev. Macromol. Chem. Phys., C29 (2&3), p. 285–297), which discusses the measurement of long chain branching using 13C nuclear magnetic resonance spectroscopy, Zimm, G. H. and Stockmayer, W. H., J. Chem. Phys., 17, 1301 (1949); and Rudin, A., Modern Methods of Polymer Characterization, John Wiley & Sons, New York (1991) pp. 103–112, which discuss the use of gel permeation chromatography coupled with a low angle laser light scattering detector (GPC-LALLS) and gel permeation chromatography coupled with a differential viscometer detector (GPC-DV). Each of these references is incorporated herein by reference. Further, A. Willem deGroot and P. Steve Chum, both of The Dow Chemical Company, at the Oct. 4, 1994 conference of the Federation of Analytical Chemistry and Sepctroscopy Society (FACSS) in St. Louis, Mo., presented data demonstrating that GPC-DV is a useful technique for quantifying the presence of long chain branches in substantially linear ethylene polymers. In particular, deGroot and Chum found that the presence of long chain branches in substantially linear ethylene polymers correlated well with the level of long chain branches measured using $^{13}$C NMR.

The homogeneous linear or substantially linear extending polmer will be an interpolymer of ethylene with at least one $C_3$–$C_{20}$ α-olefin. Exemplary $C_3$–$C_{20}$ α-olefins include propylene, isobutylene, 1-butene, 1-hexene, 4-methyl-1-pentene, 1-heptene, and 1-octene. Preferred $C_3$–$C_{20}$ α-olefins include 1-butene, 1-hexene, 4-methyl-1-pentene, 1-heptene, and 1-octene, more preferably 1-hexene and 1-octene.

The homogeneous linear or substantially linear extending polymer may further be an interpolymer of ethylene, the at least one $C_3$–$C_{20}$ α-olefin, and a non-conjugated diene having from 6 to 15 carbon atoms. Representative examples of suitable non-conjugated dienes include:

(a) Straight chain acyclic dienes such as 1,4-hexadiene; 1,5-heptadiene; and 1,6-octadiene;

(b) Branched chain acyclic dienes such as 5-methyl-1,4-hexadiene; 3,7-dimethyl-1,6-octadiene; and 3,7-dimethyl-1,7-octadiene;

(c) Single ring alicyclic dienes such as 4-vinylcyclohexene; 1-allyl-4-isopropylidene cyclohexane; 3-allylcyclopentene; 4-allylcyclohexene; and 1-isopropenyl-4-butenylcyclohexene;

(d) Multi-ring alicyclic fused and bridged ring dienes such as dicyclopentadiene; alkenyl, alkylidene, cycloalkenyl, and cycloalkylidene norbornenes, such as 5-methylene-2-norbornene; 5-methylene-6-methyl-2-norbornene; 5-methylene-6,6-dimethyl-2-norbornene; 5-propenyl-2-norbornene; 5-(3-cyclopentenyl)-2-norbornene; 5-ethylidene-2-norbornene; 5-cyclohexylidene-2-norbornene; etc.

The preferred non-conjugated dienes are selected from the group consisting of 1,4-hexadiene; dicyclopentadiene; 5-ethylidene-2-norbornene; 5-methylene-2-norbornene; 7-methyl-1,6 octadiene; piperylene; and 4-vinylcyclohexene. One suitable conjugated diene is piperylene.

The ethylene/α-olefin interpolymer will have a density of from 0.850 to 0.965 g/cm³, preferably from 0.850 to 0.900 g/cm³, and most preferably from 0.870 to 0.890 g/cm³.

The ethylene/α-olefin interpolymer may be of high or low molecular weight. Suitable number average molecular weights range from 3,000 to over 100,000, preferably from 3,000 to 60,000. In certain applications, the use of ethylene/α-olefin interpolymers having a number average molecular weight less than 20,000, preferably less than 12,000, will be preferred.

Homogeneously branched linear ethylene/α-olefin interpolymers may be prepared using polymerization processes (such, as described by Elston in U.S. Pat. No. 3,645,992) which provide a homogeneous short chain branching distribution. In his polymerization process, Elston uses soluble vanadium catalyst systems to make such polymers. However, others such as Mitsui Petrochemical Company and Exxon Chemical Company have used so-called single site catalyst systems to make polymers having a homogeneous linear structure. Homogeneous linear ethylene/α-olefin interpolymers are currently available from Mitsui Petrochemical Company under the tradename "Tafmer" and from Exxon Chemical Company under the tradename "Exact".

Substantially linear ethylene/α-olefin interpolymers are available from The Dow Chemical Company as Affinity™ polyolefin plastomers. Substantially linear ethylene/α-olefin interpolymers may be prepared in accordance with the techniques described in U.S. Pat. No. 5,272,236 and in U.S. Pat. No. 5,278,272, each of which is incorporated herein by reference.

In another embodiment, ultra-low molecular weight ethylene polymers may be employed as an extending or modifying composition. Ultra-low molecular weight ethylene polymers are disclosed and claimed in the patent application entitled Ultra-Low Molecular Weight Polymers, filed provisionally on Jan. 22, 1996 in the names of M. L. Finlayson, C. C. Garrison, R. E. Guerra, M. J. Guest, B. W. S. Kolthammer, D. R. Parikh, and S. M. Ueligger, which is incorporated herein by reference.

Ultra-low molecular weight polymers employed will be either ethylene homopolymers or interpolymers of ethylene and a comonomer selected from the group consisting of $C_3$–$C_{20}$ α-olefins, styrene, alkyl-substituted styrene, tetrafluoroethylene, vinylbenzocyclobutane, non-conjugated dienes, and cycloalkenes.

The ultra-low molecular weight polymer will have a number average molecular weight less than 8200, preferably less than 6000, and more preferably less than 5000. Such ultra-low molecular weight polymer will typically have a number average molecular weight of at least 800, preferably at least 1300.

Ultra-low molecular weight polymers, in contrast to paraffinic waxes and crystalline ethylene homopolymer or interpolymer waxes, will have a $M_w/M_n$ of from 1.5 to 2.5, preferably from 1.8 to 2.2.

Ultra-low molecular weight ethylene polymers lead to a low polymer and formulation viscosity, but are characterized by peak crystallization temperatures which are greater than the peak crystallization temperatures of corresponding higher molecular weight materials of the same density. In adhesive applications, the increase in peak crystallization temperature translates to an increased heat resistance, for instance, an improved creep resistance in pressure sensitive adhesives, and improved shear adhesion failure temperature (SAFT) in hot melt adhesives.

When the ultra-low molecular weight ethylene polymer is an interpolymer of ethylene and at least one vinylidene aromatic comonomer or hindered aliphatic vinylidene comonomer, it may be employed as a tackifier (as described above). Further, as the mole percent of ethylene increases, the crystallinity of the interpolymer will likewise increase. Accordingly, ultra-low molecular weight interpolymers of ethylene and less than 10 mole percent of the least one vinylidene aromatic comonomer or hindered aliphatic vinylidene comonomer, which interpolymers, such interpolymers may be useful as waxes to control the open and close time of the adhesive system.

In another embodiment, a traditional wax may be used as an extending or modifying composition. Modification of the adhesive with a paraffinic wax or a crystalline polyethylene wax, will tend to improve the high temperature performance, such as creep resistance and SAFT, and reduce the open and close times of adhesives comprising substantially random interpolymers which have a high styrene content.

Exemplary traditional waxes include ethylene homopolymers available from Petrolite, Inc. (Tulsa, Okla.) as Polywax™ 500, Polywax™ 1500, Polywax™ 1000, and Polywax™ 2000; and paraffinic waxes available from CP Hall under the product designations 1230, 1236, 1240, 1245, 1246, 1255, 1260, and 1262.

Polywax™ 2000 has a molecular weight of approximately 2000, an $M_w/M_n$ of approximately 1.0, a density at 16° C. of about 0.97 g/cm$^3$, and a melting point of approximately 126° C.

CP Hall 1246 paraffinic wax is available from CP Hall (Stow, Ohio). CP Hall 1246 paraffinic wax has a melting point of 143° F. (62° C.), a viscosity at 210° F. (99° C.) of 4.2 centipoise, and a specific gravity at 73° F. (23° C.) of 0.915.

Traditional waxes useful in the adhesives of the invention will typically have a density of at least 0.910 g/cm$^3$. Such waxes will have a density of no more than 0.970 g/cm$^3$, preferably no more than 0.965 g/cm$^3$.

Additives such as antioxidants (such as hindered phenols, for example, Irganox® 1010, Irganox® B900, and Irganox®1076), phosphites (such as Irgafos®168)), ultra-violet stabilizers, cling additives (such as polyisobutylene), antiblock additives, colorants, pigments, and fillers can also be included in the compositions of the present invention, to the extent that they do not interfere with the enhanced properties discovered by Applicants.

The additives are employed in functionally equivalent amounts known to those skilled in the art. For example, the amount of antioxidant employed is that amount which prevents the polymer or composition from undergoing oxidation at the temperatures and environment employed during manufacture, storage and ultimate use of the polymers. Such amounts of antioxidants is usually in the range of from 0.05 to 10, preferably from 0.1 to 5, more preferably from 0.1 to 2 percent by weight based upon the weight of the composition. When employed, the antioxidant is most typically present in an amount less than 0.5 weight percent, based on the total weight of the composition.

Similarly, the amounts of any of the other enumerated additives are the functionally equivalent amounts such as the amount to render the polymer or polymer blend antiblocking, to produce the desired amount of filler loading to produce the desired result, to provide the desired color from the colorant or pigment. Such additives can typically be employed in the range of from about 0.05 to about 50, preferably from about 0.1 to about 35, more preferably from about 0.2 to about 20 percent by weight based upon the weight of the substantially random interpolymer, although filler may be employed in amount up to 90 weight percent, based on the weight of the substantially random interpolymer.

The compositions of the invention may be prepared by standard melt blending procedures. In particular, the substantially random interpolymer(s), tackifier(s), and optional processing aid(s) may be melt blended at a temperature suitable to achieve the formation of a homogeneous melt blend, typically at temperatures of from 100–200° C., and under an inert gas blanket until a homogeneous mix is obtained. Any mixing method producing a homogeneous blend without degrading the hot melt components is satisfactory, such as through the use of a heated vessel equipped with a stirrer.

Further, the substantially random interpolymer(s), tackifier(s) and optional extending or modifying composition(s) may be provided to an extrusion coater for application to the substrate. The compositions may further be prepared in a multi-reactor process, for example producing the substantially random interpolymer in one reactor and further polymer component (such as an ultra-low molecular weight polymer or wax) in a second reactor, with other components optionally being introduced into the second reactor or at a point downstream of the second reactor, such as via a sidearm extruder.

In one preferred embodiment, the composition of the invention will be provided in the form of an adhesive which comprises at least one substantially random interpolymer. Typically, the adhesive will comprise from 5 to 75 weight percent of at least one tackifier, more preferably from 10 to 70 weight percent of at least one tackifier. As set forth above, the tackifier will preferably have an aromatic character. In some instances, the tackifier will be an ultra-low molecular weight interpolymer of ethylene and at least one vinylidene aromatic comonomer or hindered aliphatic vinylidene comonomer, which interpolymer comprises at least 25 mole percent of the at least one vinylidene aromatic comonomer or hindered aliphatic vinylidene comonomer.

The adhesive of the invention may further comprise at least one modifying composition, as described above. When such a modifying composition is employed, it will typically be present in the adhesive system in an amount of from 5 to 75 weight percent. One such modifying composition is a traditional wax or an ultra-low molecular weight ethylene polymer. In some instances, the ultra-low molecular weight ethylene polymer will be an interpolymer of ethylene and at least one vinylidene aromatic comonomer or hindered aliphatic vinylidene comonomer, which interpolymer comprises less than 10 mole percent of the at least one vinylidene aromatic comonomer or hindered aliphatic vinylidene comonomer.

Moreover, the adhesive of the invention may comprise a plurality of substantially random interpolymer components which differ in the amount of vinylidene aromatic monomer or hindered aliphatic vinylidene monomer content, which differ in molecular weight, or which differ in both the amount of vinylidene aromatic monomer or hindered aliphatic vinylidene monomer content and in molecular weight.

It will be clear that an adhesive containing a very high content of the substantially random interpolymer may be designed. For instance, one such adhesive may comprise as the strength imparting component of the adhesive, from 5 to 75 weight percent of a substantially random interpolymer of ethylene and at least one vinylidene aromatic comonomer or hindered aliphatic vinylidene comonomer, which interpolymer has an Mn of greater than about 10,000 and comprises from 10 to less than 25 mole percent of the at least one vinylidene aromatic comonomer or hindered aliphatic vinylidene comonomer; as a wax, from 5 to 75 weight percent of a substantially random interpolymer of ethylene and at least one vinylidene aromatic comonomer or hindered aliphatic vinylidene comonomer, which interpolymer has an Mn of less than about 8,200 and comprises from 1 to less than 10 mole percent of the at least one vinylidene aromatic comonomer or hindered aliphatic vinylidene comonomer; and as a tackifier, from 5 to 75 weight percent of a substantially random interpolymer of ethylene and at least one vinylidene aromatic comonomer or hindered aliphatic vinylidene comonomer, which interpolymer has an Mn of less than about 8,200 and comprises at least 25 mole percent of the at least one vinylidene aromatic comonomer or hindered aliphatic vinylidene comonomer.

As set forth in J. Class and S. Chu, Handbook of Pressure Sensitive Adhesive Technology, Second Edition, D. Satas, e., 1989, pp 158–204, incorporated herein by reference, the requirements for pressure sensitive adhesive behavior may be defined by temperature and rate dependent viscoelastic properties of the materials and formulations.

Broadly speaking, to be a suitable pressure sensitive, the formulations must have a glass transition temperature of from −20 to 25° C., preferably from −10 to 10° C., as reflected by the tan $\delta$ peak temperature at 1 radian per second, as determined by dynamic mechanical spectroscopy. Broad glass transition peaks are favored, in that when the peak is broad, the adhesive will perform over a wider temperature range, thereby increasing its utility. Further, adhesives having a broad glass transition peak typically be characterized as having increased tack and peel strength.

According to what has come to be known as the Dahlquist criteria, broadly speaking, to be a suitable pressure sensitive, the formulation must have a plateau shear modulus at 25° C. at 1 radian per second which is between $1 \times 10^5$ and $6 \times 10^6$ dynes/cm$^2$, preferably from $1 \times 10^5$ and $3 \times 10^5$ dynes/cm$^2$, as determined by dynamic mechanical spectroscopy. A material stiffer than this, that is, a material which has a plateau shear modulus at 25° C. of $1 \times 10^7$ dynes/cm$^2$, will not exhibit surface tack at room temperature. A material less stiff than this, that is, a material which has a plateau shear modulus at 25° C. of $1 \times 10^4$ dynes/cm$^2$, will lack sufficient cohesive strength to be useful.

In particular, preferred pressure sensitive adhesives for use in low peel labels will have a G' of from $3 \times 10^5$ to $1 \times 10^6$ dynes/cm$^2$ (0.3 to 1 MPa) and a glass transition temperature of from −50 to −30° C. Preferred pressure sensitive adhesives for use in freezer labels will have a G' of from $8 \times 10^4$ to $2 \times 10^5$ dynes/cm$^2$ (0.08 to 0.2 MPa) and a glass transition temperature of from −45 to −30° C. Preferred pressure sensitive adhesives for use in cold temperature labels will have a G' of from $2 \times 10^5$ to $1 \times 10^6$ dynes/cm$^2$ (0.2 to 1 MPa) and a glass transition temperature of from −25 to −10° C. Preferred pressure sensitive adhesives for use in pressure sensitive adhesive tapes will have a G' of from $7 \times 10^5$ to $5 \times 10^6$ dynes/cm$^2$ (0.7 to 5 MPa) and a glass transition temperature of from −10 to 10° C. Preferred pressure sensitive adhesives for use in high peel labels will have a G' of from $2 \times 10^5$ to $6 \times 10^5$ dynes/cm$^2$ (0.2 to 0.6 MPa) and a glass transition temperature of from 0 to 10° C. Preferred pressure, sensitive adhesives for use in disposables will have a G' of from $4 \times 10^5$ to $2 \times 10^6$ dynes/cm$^2$ (0.4 to 2 MPa) and a glass transition temperature of from 10 to 30° C.

Glass transition temperature is a function of tackifier content, the presence and amount of processing aid, and the styrene content and molecular weight of the substantially random interpolymer. Accordingly, to raise the glass transition temperature of the composition of the invention, one may increase the amount of or glass transition temperature of the tackifier, decrease the amount of processing aid, or increase the amount of vinylidene aromatic monomer or hindered aliphatic vinylidene monomer in the substantially random interpolymer. The plateau shear modulus is a function of the presence and amount of processing aid and the styrene content and molecular weight of the substantially random interpolymer. To decrease the G', one may increase the amount of processing aid in the composition or increase the amount of vinylidene aromatic monomer or hindered aliphatic vinylidene monomer in the substantially random interpolymer.

The compositions of the invention will have utility in applications in which adhesives, particularly hot melt adhesives are typically employed. Some representative examples include packaging, box and carton sealing, bookbinding, lamination of veneers to a substrate, tapes, and labels. The compositions may further be utilized in multilayer food packaging structures wherein at least one layer of the structure is aluminum. The compositions may be readily extruded onto a variety of substrates, including but not limited to carpet backing, flooring tiles and sheets, and woven and nonwoven fabric. The compositions may similarly be molded into a variety of shapes, including but not limited to shoe soles, seals, toys, durable goods, wire and cable, and gaskets.

The following Examples are provided to illustrate particular embodiments of the claimed invention, rather than to limit the scope of the invention thereto.

EXAMPLE ONE

Preparation of Adhesives Based on Substantially Random Interpolymers of Ethylene and a Monovinylidene Aromatic Comonomer Polymerization of Substantially Random Interpolymers of Ethylene and a Monovinylidene Aromatic Comonomer Polymer A was prepared in a one gallon (3.8 L) agitated semi-continuous batch reactor. The reaction mixture consisted of approximately 1100 grams cyclohexane and 818 grams styrene. Prior to addition to the reactor, solvent, styrene and ethylene were purified to remove water and oxygen. The inhibitor in the styrene was also removed. Temperature in the vessel was controlled to a set-point of 60° C. by varying the coolant flow in the cooling coils of the reactor. The vessel was then pressure controlled to a set point of 100 psig (4.8 kPa) with ethylene. Hydrogen was added in a controlled fashion to control molecular weight. The catalyst components, which comprise a monocyclopentadienyl titanium-containing catalyst, such as titanium: (N-1,1-dimethylethyl)dimethyl(1-(1,2,3,4,5-eta)-2,3,4,5-tetramethyl-2,4-cyclopentadien-1-yl)silanaminato))(2-)N)-dimethyl, CAS# 135072-62-7, Tris(pentafluorophenyl) boron, CAS# 001109-15-5, modified methylaluminoxane Type 3A, CAS# 146905-79-5, were flow controlled, on a mole ratio basis of 1/1.5/20 respectively, and were combined and added to the vessel. After starting, the polymerization was allowed to proceed with ethylene supplied to the reactor as required to maintain vessel pressure. In this case, approximately 50 grams of ethylene were loaded in the reactor, ethylene flowed into the reactor at a maximum rate of 5.6 grams/minute, and the total amount of ethylene added was 87 grams. The run continued for 30 minutes. At the end of the run, the catalyst flow was stopped, ethylene was removed from the reactor, about 1000 ppm of Irganox™ 1010 antioxidant on a polymer basis was then added to the solution and the polymer was isolated from the solution. The resulting polymers may be isolated from solution by either stripping by use of a devolatilizing extruder.

Preparation of Adhesive Formulations

The indicated substantially random interpolymer, tackifier, plasticizer, styrene block copolymer, and antioxidant were simultaneously added in the indicated amounts to a Haake Rheocord 40 mixer using a 200 gram mixing bowl maintained at about 130° C. at 95 revolutions per minute. The ingredients were mixed for about 5 minutes, until they became molten.

Escorez™ 5300 petroleum hydrocarbon resin is a tackifier available from Exxon Chemical Company (Houston, Tex.).

Irganox™ B900 hindered phenolic antioxidant is available from Ciba-Geigy.

Primoil 355 is a mineral oil.

Example 1 was tested for initial viscosity and viscosity after three days, using a Brookfield viscometer at 350° F. (177° C.), probe tack, modulus (G'), and peak tan delta. The formulations and the measured properties are set forth in Table One. Note that in the case of modulus and peak tan delta, the reported values were extracted from a computer-generated plot of the results.

TABLE ONE

|  | Example 1 |
|---|---|
| Polymer A | 100/45.2 |
| Escorez ™ 5300 Tackifier | 100/45.2 |
| Primoil 355 | 20/9.0 |
| Irganox ™ B900 Antioxidant | 1/0.5 |
| Probe tack | 94 |
| G' at 0° C. (dynes/cm$^2$ (MPa)) | $1.58 \times 10^8$ (158) |
| G' at 25° C. (dynes/cm$^2$ (MPa)) | $7.94 \times 10^5$ (0.794) |
| G' at 50° C. (dynes/cm$^2$ (MPa)) | $1.58 \times 10^5$ (0.158) |
| G' at 75° C. (dynes/cm$^2$ (MPa)) | $2.51 \times 10^4$ (0.0251) |
| Temp. at which G' = $10^4$ dynes/cm$^2$ (10 kPa) (° C.) | 89 |
| Temp. at which G' = $10^5$ dynes/cm$^2$ (100 kPa)(° C.) | 57 |
| Peak tan delta (° C.) | 4 |

As illustrated in Table One, the adhesive of Example 1 meets the Dahlquist criteria, indicating its suitability as a traditional pressure sensitive adhesive. The adhesive of Example 1 is further preferred in that it has a glass transition temperature in the range of −45 to 30° C. The data regarding Example 1, taken in conjunction with the Dahlquist criteria, suggest that the adhesive of Example 1 may be suitably employed as a high peel label and/or as a pressure sensitive adhesive tape.

Example 2–8 and Comparative Examples A and B Hot Melt Adhesives for Bonding Aluminum Preparation of Ethylene Styrene Interpolymers B and C Polymer is prepared in a 400 gallon (1500 L) agitated semi-continuous batch reactor, utilizing the process conditions set forth in the following Table Two. The reaction mixture consisted of approximately 250 gallons (950 L) of a solvent comprising a mixture of cyclohexane (85 weight percent) and isopentane (15 weight percent), and styrene. Prior to addition, solvent, styrene and ethylene are purified to remove water and oxygen. The inhibitor in the styrene is also removed. Inserts are removed by purging the vessel with ethylene. The vessel is then pressure controlled to a set point with ethylene. Hydrogen is added to control molecular weight. Temperature in the vessel is controlled to set-point by varying the jacket water temperature on the vessel. Prior to polymerization, the vessel is heated to the desired run temperature and the catalyst components: Titanium: (N-1,1-dimethylethyl)dimethyl(1-(1,2,3,4,5-eta)-2,3,4,5-tetramethyl-2,4-cyclopentadien-1-yl)silanaminato))(2-)N)-dimethyl, CAS# 135072-62-7, Tris(pentafluorophenyl) boron, CAS# 001109-15-5, Modified methylaluminoxane Type 3A, CAS# 146905-79-5, are flow controlled, on a mole ratio basis of 1/3/5 respectively, combined and added to the vessel. After starting, the polymerization is allowed to proceed with ethylene supplied to the reactor as required to maintain vessel pressure. In some cases, hydrogen is added to the headspace of the reactor to maintain a mole ratio with respect to the ethylene concentration. At the end of the run, the catalyst flow is stopped, ethylene is removed from the reactor, about 1000 ppm of Irganox* 1010 antioxidant is then added to the solution and the polymer is isolated from the solution. The resulting polymers are isolated from solution by either stripping by use of a devolatilizing extruder.

TABLE TWO

| Sample Number | Solvent loaded | | Styrene loaded | | Pressure | | Temp. | Total H$_2$ Added | Run Time | Polymer in Solution Weight |
|---|---|---|---|---|---|---|---|---|---|---|
| | lbs | kg | lbs | kg | Psig | kPa | °C. | Grams | Hrs. | Percent |
| (B) | 839 | 381 | 661 | 300 | 105 | 724 | 60 | 53.1 | 4.8 | 11.6 |
| (C) | 1196 | 542 | 225 | 102 | 70 | 483 | 60 | 7.5 | 6.1 | 7.2 |

| Sample Number | Melt Index (I$_2$ at 190° C.) | Total Weight Percent Styrene in Polymer* | Talc Level (Weight Percent) | Isolation Method |
|---|---|---|---|---|
| (B) | 2.6 | 45.5 | 0 | Extruder |
| (C) | 0.03 | 29.8 | 0 | Extruder |

*Total weight percent stryrene measured via Fourier Transform Infrared (FTIR) technique The interpolymer and vinyl aromatic polymer characteristics are given in Table Three. The unblended polymers provide the comparative examples of this invention.

Test parts and characterization data for the interpolymers were generated according to the following procedures:

Plaques are compression molded as follows. Samples are melted at 190° C. for 3 minutes and compression molded at 190° C. under 20,000 lb of pressure for another 2 minutes. Subsequently, the molten materials are quenched in a press equilibrated at room temperature.

Differential scanning calorimetry (DSC) determinations are made as follows. A DuPont DSC-2920 is used to measure the thermal transition temperatures and heat of transition for the interpolymers. In order to eliminate previous thermal history, samples are first heated to 200° C. Heating and cooling curves are recorded at 10° C./min. Melting (from second heat) and crystallization temperatures are recorded from the peak temperatures of the endotherm and exotherm, respectively.

Melt shear rheology determinations are made as follows. Oscillatory shear rheology measurements are performed with a Rheometrics RMS-800 rheometer Rheological properties are monitored at an isothermal set temperature of 190° C. in a frequency sweep mode. In tabulated data, η is the viscosity and η(100/0.1) is the viscosity ratio of values recorded at 100/0.1 rad/sec frequencies.

Shore A hardness is measured at 23° C. following ASTM-D240.

Flexural modulus is evaluated according to ASTM-D790.

Tensile properties of the compression molded samples are measured using an Instron 1145 tensile machine equipped with an extensiometer. ASTM-D638 samples are tested at a strain rate of 5 min$^{-1}$. The average of four tensile measurements is given. The yield stress and yield strain are recorded at the inflection point in the stress/strain curve. The Energy at break is the area under the stress/strain curve.

Tensile stress relaxation is determined as follows. Uniaxial tensile stress relaxation is evaluated using an Instron 1145 tensile machine. Compression molded film (approximately 20 mil, 0.0508 cm., thick) with a 1" (2.54 cm) gauge length is deformed to a strain level of 50 percent at a strain rate of 20 min$^{-1}$. The force required to maintain 50 percent elongation is monitored for 10 minutes. The magnitude of the stress relaxation is defined as $(f_i - f_f / f_i)$ where $f_i$ is the initial force and $f_f$ is the final force.

Thermomechanical analysis (TMA) data are generated using a Perkin Elmer TMA 7 series instrument. Probe penetration to 1 mm is measured on 2 mm thick compression molded parts using a heating rate of 5° C./min and a load of 1 Newton.

TABLE THREE

Interpolymer and vinylidene aromatic polymer blend Components

| | (C) | (D) |
|---|---|---|
| Composition | | |
| weight percent atactic Polystyrene in Interpolymer[1] | 10.3 | 1 |
| weight percent Styrene[1] | 43.4 | 29.3 |
| weight percent Ethylene | 56.6 | 70.7 |
| mole percent Styrene | 17.1 | 10 |
| mole percent Ethylene | 82.9 | 90 |
| Molecular Weight | | |
| Melt flow rate, I$_2$ (g/10 min) | 2.62 | 0.03 |
| M$_n$ × 10$^{-3}$ | 66.8 | 118.1 |
| M$_w$/M$_n$ | 1.89 | 2.04 |
| Physical Properties | | |
| Density. g/cc | 0.9626 | 0.943 |
| Tm, °C. | 49.6 | 71.3 |
| Percent Crystallinity | 4.8 | 14.7 |
| Tc, °C. | 22.1 | 58.1 |
| Tg(DSC) | approximately −12 | −17.2 |
| Mechanical Properties | | |
| Shore A | 75 | 88 |
| Tensile Modulus, MPa | 6.5 | 20 |
| Flexural Modulus, MPa | 68.8 | 62.1 |
| Yield Stress, MPa | 1.3 | 2.4 |
| Percent Strain at Break | 475.3 | 377.5 |
| Stress at Break, MPa | 22.6 | 34.3 |
| Energy at Break, N · m | 102.2 | 145.5 |
| Percent Stress Relaxation (50 percent/10 min) | 38 | 30.2 |
| Melt Rheology | | |
| η × 10$^{-5}$(0.1 rad/sec), Poise | 1.05 | 16.6 |
| η(100/0.1) | 0.15 | 0.16[2] |
| Tan δ(0.1 rad/sec) | 4.2 | 2.37 |

[1]Measured by NMR technique.
[2]Ratio of η(1.6)/η(0.1).

The formulations described in Table Four were prepared in a 60 mL Brabender mixer using roller blades. The bowl was heated to 130° C. prior to polymer introduction. The blade speed was 30 revolutions/minute. After the polymer was fused (approximately 5 minutes) the other ingredients were added in small portions over a period of 10 to 30 minutes. The rate of addition depended on the rate at which the mixing incorporated the material into the mixture. Where there was a large mismatch in the melt viscosity of the materials being mixed, higher temperatures and longer mixing times were used. After the addition was complete, mixing was continued for 10 minutes or until the sample was visually homogeneous.

Adhesion samples were prepared from 3.17×15 cm strips of aluminum foil 0.002 cm thick. The surface was wiped with methyl ethyl ketone prior to bonding to remove any surface contamination. Samples were prepared in a tetrahedron press with the platens set at 177° C. The samples were compression molded between layers of silicone release paper using the following cycle: (1) equilibrate 30 seconds at 177° C. under contact pressure, (2) ramp ram pressure to 11.2 kg/cm², (3) maintain pressure for 2 minutes and release. The pressure corresponds to approximately 1.4 kg/cm² on the samples.

Samples were tested in the T-peel geometry (ASTM-1876) using an Instroni tensile tester. Crosshead speed was 2.5 cm/min. Sample composition and performance are set forth in Table Four.

TABLE FOUR

| | Polymer type and amount (weight percent) | Tackifier (weight percent) | Wax (weight percent) | Peel strength (g/cm) |
|---|---|---|---|---|
| Example 2 | Polymer B--100 | | | 98 |
| Example 3 | Polymer B--50 | Wingtack ™ 86--50 | | 1532 |
| Example 4 | Polymer B--50 | Hercotac ™ 1149--50 | | 672 |
| Example 5 | Polymer B--50 | Eastotac ™ H130--50 | | 870 |
| Example 6 | Polymer C--50 | Wingtack ™ 86--50 | | 1180 |
| Example 7 | Polymer C--50 | Wingtack ™ 95--50 | | 127 |
| Example 8 | Polymer B--40 | Wingtack ™ 86--40 | Polywax ™ 1000--20 | 329 |
| Comparative Example A | Polymer D--33 | Wingtack ™ 95--33 | Polywax ™ 1000--33 | 77 |
| Comparative Example B | Polymer E--50 | Wingtack ™ 95--50 | Polywax ™ 1000--33 | 257 |

Wingtack is a trademark of Goodyear. Hercotac is a trademark of Hercules. Eastotac is a trademark of Eastman Chemical. Polywax is a trademark of Petrolite.

A comparison of Examples 3 to 6 of Table Four illustrates the fact that formulations including an appropriate tackifier exhibit peel strengths which are improved over that of the uncompounded ethylene/styrene interpolymer. Formulation 7 illustrates the negative effect of an incompatible or only partially compatible tackifier. As illustrated by Example 8, the addition of wax to the high peel strength adhesive of Example 3 decreases the peel strength as compared to that of the adhesive of Example 3, but results in a peel strength which is superior to that of the comparative ethylene/octene interpolymer based formulations of Comparative Examples A and B.

EXAMPLES 9–21 and Comparative Examples C, D, and E

The formulations utilized in the following examples were prepared in the manner set forth above. In the case of Examples 9–12, the polymer utilized was Polymer D, a substantially random ethylene/styrene interpolymer having 42 weight percent styrene and a melt index ($I_2$) of 1 g/10 min. In the case of Examples 13–16, the polymer utilized was Polymer E, a substantially random ethylene/styrene interpolymer having 57 weight percent styrene. In the case of Examples 17–21, the polymer utilized was Polymer F, a substantially random ethylene/styrene interpolymer having 65 weight percent styrene. The tackifier utilized was Piccotex 75, which is a pure monomer resin having a glass transition temperature, as determined by DSC, of 31° C., and which is available from Hercules. The extending or modifying composition utilized was Tuflo 6056, which is a mineral oil available from Lyondell Petrochemical.

The resultant formulations were evaluated for glass transition temperature, tensile at break, elongation at break, bond strength, G', 100 percent modulus, 200 percent modulus, and toughness.

In the case of tensile determinations, samples were molded at 115° C. for 5 minutes at 10 tons ram pressure. Samples which were 1 inch (2.54 cm) by 0.125 inches (0.318 cm) are utilized. The Instron tensiometer was set at a crosshead speed of 50 cm/min. Modulus was taken as the slope of the stress-strain curve at 100 and 200 percent extension (as measured by crosshead displacement). Toughness was the area under the stress-strain curve.

In the case of G' determinations, a Rheometrics RDSII Solids Analyzer was used with 8 mm diameter parallel plates, operated in the shear mode. The test rate was 1 radian/second. The temperature was stepped from 5 to 10° C., and was allowed to equilibrate for 2 minutes before data collection.

The formulations and the resultant properties are set forth in the following Table Five.

TABLE FIVE A

| Example | Polymer Sample | Polymer (wt percent) | Tackifier (wt percent) | Processing aid (wt percent) | Glass Transition Temperature (° C.) | G' (dynes/cm²) (Pa) | Tensile strength (psi (MPa)) |
|---|---|---|---|---|---|---|---|
| Comp. Ex. C | D (42 percent) | 100 | 0 | 0 | −22 | 1.36 × 10$^7$ (1.36 × 10$^6$) | 1879 (12.9) |
| 9 | D | 40 | 47.5 | 12.5 | −29.7 | 2.62 × 10$^6$ (2.62 × 10$^5$) | 882 (6.08) |
| 10 | D | 40 | 60 | 0 | −8.2 | 1.06 × 10$^7$ (1.06 × 10$^6$) | 3280 (22.6) |
| 11 | D | 55 | 45 | 0 | −12.2 | 6.03 × 10$^6$ (6.03 × 10$^5$) | 3689 (22.5) |
| 12 | D | 70 | 30 | 0 | −13.4 | 7.78 × 10$^6$ (7.78 × 10$^5$) | 3260 (25.4) |
| Comp. Ex. D | E (57 percent) | 100 | 0 | 0 | −10 | 1.21 × 10$^7$ (1.21 × 10$^6$) | 543 (3.74) |
| 13 | E | 40 | 47.5 | 12.5 | −15.2 | 2.91 × 10$^6$ (2.91 × 10$^5$) | 275 (1.90) |

TABLE FIVE A-continued

| | | | | | | | |
|---|---|---|---|---|---|---|---|
| 14 | E | 40 | 60 | 0 | 7.5 | 7.30 × 10⁶ (7.30 × 10⁵) | 1867 (12.9) |

| Example | Elongation at break (percent) | 100 percent modulus (psi (MPa)) | 200 percent modulus (psi (MPa)) | Toughness (psi (MPa)) | Coating thickness (inches (cm)) | Average strength (lbs/in (N/25.4 mm)) |
|---|---|---|---|---|---|---|
| Comp. Ex. C | 930 | 295 (2.0) | 361 (2.5) | 7507 (951.8) | N/D | N/D |
| 9 | 1907 | 68.9 (0.48) | 77.4 (0.53) | 6637 (45.8) | 0.0165 (0.04) | 7.59 (33.8) |
| 10 | 766 | 368 (2.53) | 578 (1.68) | 10510 (72.5) | 0.0245 (0.062) | 8.95 (39.8) |
| 11 | 1235 | 176 (1.34) | 239 (1.65) | 14121 (97.6) | 0.024 (0.061) | 10.3 (17.9) |
| 12 | 1382 | 195 (1.21) | 243 (0.18) | 14155 (97.4) | 0.0235 (0.060) | 4.02 (44.6) |
| Comp. Ex. D | 1030 | 261 (1.8) | 294 (2.03) | 3361 (23.2) | N/D | N/D |
| 13 | 1889 | 14.3 (0.099) | 25.6 (0.18) | 2240 (15.4) | 0.0165 (0.042) | 6.83 (30.4) |
| 14 | 565 | 418 (2.9) | 583 (4.02) | 5666 (39.1) | 0.0155 (0.039) | 11.22 (49.9) |

TABLE FIVE B

| Example | Polymer Sample | Polymer (wt percent) | Tackifier (wt percent) | Processing aid (wt percent) | Glass Transition Temperature (°C.) | G' (dynes/cm² (Pa)) | Tensile strength (psi (MPa)) | Elongation at break (percent) | 100 percent modulus (psi (MPa)) | 200 percent modulus (psi (MPa)) | Toughness (psi (MPa)) | Coating thickness (inches (cm)) | Average strength (lbs/in (N/25.4 |
|---|---|---|---|---|---|---|---|---|---|---|---|---|---|
| 15 | E | 55 | 45 | 0 | 2.9 | 4.96 × 10⁶ (4.96 × 10⁵) | 2009 (15.0) | 917 | 202 (1.5) | 271 (2.07) | 6683 (65.8) | 0.023 (0.058) | 12.65 (29.6) |
| 16 | E | 70 | 30 | 0 | -0.2 | 5.63 × 10⁶ (5.63 × 10⁵) | 2172 (13.9) | 1077 | 211 (1.4) | 300 (1.87) | 9539 (46.1) | 0.023 (0.058) | 6.65 (56.3) |
| Comp. Ex. E | F(65 percent) | 100 | 0 | 0 | -3.2 | 1.36 × 10⁷ (1.36 × 10⁶) | 1077 (7.43) | 684 | 302 (2.1) | 413 (2.84) | 3963 (27.3) | N/D | N/D |
| 17 | F | 40 | 47.5 | 12.5 | 0.1 | 1.90 × 10⁶ (1.90 × 10⁵) | 735.8 (5.07) | 1514 | 64.2 (0.44) | 77.5 (0.53) | 3832 (26.4) | 0.0205 (0.052) | 7.73 (34.3) |
| 18 | F | 40 | 60 | 0 | 19.9 | 1.63 × 10⁶ (1.63 × 10⁵) | 1725 (11.9) | 368 | 899 (6.2) | 1146 (7.9) | 4519 (31.2) | 0.0235 (0.06) | 6.88 (30.6) |
| 19 | F | 55 | 45 | 0 | 13.2 | 6.59 × 10⁶ (6.59 × 10⁵) | 2996 (20.0) | 607 | 0.24 (1.21) | 592 (2.06) | 7739 (55.8) | 0.025 (0.064) | 2.25 (41.4) |
| 20 | F | 70 | 30 | 0 | 8.9 | 6.11 × 10⁶ (6.11 × 10⁵) | 2896 (20.7) | 822 | 176 (0.002) | 299 (4.08) | 8086 (53.4) | 0.0245 (0.062) | 9.31 (10.0) |

Table Five shows that the addition of tackifier to a substantially random ethylene/styrene interpolymer increases the tensile toughness of the interpolymer. This increase in toughness (the result of the increased strain-hardening of the formulation) contributes to an increase in the peel strength of a bonded aluminum specimen. The aluminum-aluminum bonds are made at 177° C. for 120 seconds under 8 pounds/square inch (0.055 Mpa) pressure. As illustrated by Table Six, the addition of tackifier to a substantially random ethylene/styrene interpolymer has the ability to increase the toughness of a substantially random ethylene/styrene interpolymer which has less than 5 percent crystallinity by DSC, that is, which is predominantly amorphous in character.

EXAMPLES 21–23 and Comparative Examples F and G PSA Tapes

Samples of pressure sensitive adhesive tapes were prepared by coating from the melt onto a 0.051 mm thick polyester backing, and were covered with silicone release paper for storage and transportation. The coater was a commercial unit available from Chemsultants International. The adhesive layers were in the range of 0.09 to 0.115 mm thick. Tests were performed in accordance with the Pressure Sensitive Tape Council (PSTC) standards. A 180° peel test on stainless steel was done at 30 cm/min, at both 5 minute and 24 hour dwell times. Shear tests (Holding Power) were performed at room temperature with a 1000 gram load and an overlay of 12.7×25.4 mm on mirror polished stainless steel.

In the case of Comparative Example F, the polymer was Vector 4113 styrene/isoprene/styrene block copolymer, available from Dexco Company. In the case of Comparative Example G, the polymer was Vector 4114 styrene/isoprene/styrene block copolymer, available from Dexco Company. In the case of Examples 21–23, the polymer was the substantially random interpolymer of Polymer E.

The formulations employed and the resultant adhesive properties are set forth in the following Tables Six and Seven:

TABLE SIX

| | Comp. Ex. F | Comp. Ex. G | 21 | 22 | 23 |
|---|---|---|---|---|---|
| Vector 4113 | 41.7 | 0 | 0 | 0 | 0 |
| Vector 4114 | 0 | 35.7 | 0 | 0 | 0 |
| Polymer E | 0 | 0 | 48.75 | 57.6 | 42.5 |
| Wingtack 95 | 52.1 | 50.0 | 0 | 0 | 0 |

TABLE SIX-continued

|  | Comp. Ex. F | Comp. Ex. G | 21 | 22 | 23 |
|---|---|---|---|---|---|
| Piccotex 75 | 0 | 0 | 38.75 | 30.0 | 32.5 |
| Tuflo 6056 | 6.3 | 14.3 | 12.5 | 12.5 | 25.0 |

TABLE SEVEN

|  | Comp. | Comp. | 21 | 22 | 23 |
|---|---|---|---|---|---|
| Thickness (mils (cm)) | 4.65 (0.12) | 4.25 (0.11) | 4.7 (0.12) | 4.2 (0.11) | 3.7 (0.09) |
| Peel (lbs/in (N/25.4 mm)) | 12.69 (56.4) | 5.97 (26.6) | 1.85 (8.22) | 0.48 (2.13) | 0.17 (0.76) |
| 24 hour peel (lbs/in (N/25.4 mm)) | N/D | N/D | 3.29 (14.6) | 1.53 (6.81) | 0.817 (3.63) |
| Shear (min) | 259 | 22 | 1242 | 1796 | 40 |
| Tg (° C.) | N/D | −19.8 | −15.7 | −16.5 | −20 |
| G' (dynes/cm$^2$ (Pa)) | 6.13 × 10$^5$ (6.13 × 10$^4$) | 1.71 × 10$^5$ (1.71 × 10$^4$) | 1.92 × 10$^6$ (1.92 × 10$^5$) | 3.96 × 10$^6$ (3.96 × 10$^5$) | 9.32 × 10$^5$ (9.32 × 10$^4$) |
| Tensile (psi (MPa)) | N/D | N/D | 192 (1.32) | 79 (0.54) | 24 (0.17) |

Tables Six and Seven show that substantially random ethylene/styrene interpolymers having from 39 to 65, preferably from 45 to 55 weight percent styrene can be formulated to give low tack pressure sensitive adhesive formulations with improved creep resistance when compared to styrene block copolymer formulations.

Tackifier Screening Study

The tackifiers evaluated in the study, as well as properties obtained from trade literature, are set forth in the following Table Eight:

DACP Cloud point reflects polarity of the resin, with lower values indicating a higher degree of polarity. MMAP cloud point is a value which reflects resin aromatic compatibility, with lower values indicating a greater degree of aromaticity.

Formulations were prepared and evaluated, with the formulations employed and the resultant properties being set forth in the following Table Nine.

TABLE EIGHT

| Tackifier | Manufacturer | Feedstock | Mn | Tg | DACP Cloud* | MMAP Cloud |
|---|---|---|---|---|---|---|
| ECR 165 | Exxon | Aromatic/Cycloaliphatic |  | 59 |  |  |
| Escorez 5380 | Exxon | Cycloaliphatic | 160 | 35 |  |  |
| ECR 149B | Exxon | Hydrogenated C5–C6 |  | 48 |  |  |
| ECR 179 | Exxon | Hydrogenated Cycloaliphatic |  | 57 |  |  |
| Wingtack 86 | Goodyear | Aromatic Modified C5 |  | 37 |  |  |
| Wingtack 95 | Goodyear | C5 Hydrocarbon |  | 59 |  |  |
| Hercotac 1149 | Hercules | Aliphatic/Aromatic (C5–C9) | 850 | 45 | 24 | 68 |
| Piccotex 75 | Hercules | Copolymer Modified Styrene | 680 | 29 | <−50 | 1 |
| Piccotex 100 | Hercules | Copolymer Modified Styrene | 1200 | 42 | −50 | 6 |
| Regalrez 3102 | Hercules | Hydrogenated Styrenic | 875 | 51 | −30 | 24 |
| Kristalex 3070 | Hercules | Copolymer of pure monomer | 580 | 27 | <−50 | 0.4 |
| Piccolastic A5 | Hercules | Styrenic Monomers | 360 | −28 | <−50 | −4 |
| Piccolastic A75 | Hercules | Styrenic Monomers | 670 | 28 | <−50 | 6 |
| Regalite R101 | Hercules | Hydrogenated Hydrocarbon |  | 44 |  |  |
| Foral 85 | Hercules | Rosin Ester |  | 35 |  |  |
| Staybelite Ester 10 | Hercules | Hydrogenated Wood Rosin |  | 29 |  |  |
| Eastotac H100E | Eastman | Modified C5 |  | 49 |  |  |
| Piccotac 95 | Hercules | C5 Hydrocarbon | 800 | 43 | 49 | 95 |

*DACP Cloud point reflects polarity of the resin, with lower values indicating a higher degree of polarity. MMAP cloud point is a value which reflects resin aromatic compatibility, with lower values indicating a greater degree of aromaticity.

TABLE NINE

| Tackifier ID | Tackifier Phr | DSC Tg (° C.) | DMS G' at 20 C. (dynes/cm²) | Tensile Max (psi (MPa)) | Elongation at Break (percent) | 100 percent Modulus (psi (MPa)) | 200 percent Modulus (psi (MPa)) | Toughness (psi (MPa)) |
|---|---|---|---|---|---|---|---|---|
| | | −10.00 | 1.21E+07 | 543 (3.74) | 1030 | 261 (1.8) | 294 (2.0) | 3361 (23.2) |
| ECR 165 | 100 | 6.40 | 8.32E+07 | 2418 (16.7) | 587 | 598 (4.1) | 911 (6.3) | 8083 (55.7) |
| Escorez 5380 | 100 | 7.80 | 1.62E+08 | 1543 (10.6) | 1003 | 177 (1.2) | 231 (1.6) | 5732 (39.5) |
| ECR 149B | 100 | 6.40 | 9.49E+07 | 1654 (11.4) | 622 | 426 (2.9) | 565 (3.9) | 5628 (38.8) |
| ECR 179 | 100 | 7.60 | 8.55E+06 | 2286 (15.8) | 544 | 587 (4.0) | 839 (5.8) | 6856 (47.3) |
| ECR 179 | 100 | 5.50 | 8.59E+06 | 3047 (21.0) | 1012 | 171 (1.2) | 226 (1.6) | 8100 (55.9) |
| Escorez 5380 | 100 | 11.00 | 5.73E+06 | 1630 (11.2) | 1288 | 116 (0.8) | 146 (1.0) | 6220 (42.9) |
| Wingtack 86 | 100 | 0.20 | 2.59E+07 | 1862 (12.8) | 627 | 362 (2.5) | 609 (4.2) | 5813 (40.1) |
| Wingtack 95 | 100 | 6.50 | 3.29E+08 | | | | | |
| Hercotac 1149 | 100 | 7.70 | 2.45E+07 | 2205 (15.2) | 538 | 601 (4.1) | 970 (6.7) | 6573 (45.3) |
| Piccotex 75 | 100 | 2.8 | | 3070 (21.2) | 864 | 220 (1.5) | 301 (2.1) | 7957 (54.9) |
| Piccotex 100 | 100 | 2.4 | | 3520 (24.3) | 527 | 1160 (8) | 1537 (10.8) | 10152 (70.0) |
| Regalrez 3102 | 100 | −7.8 | | 2194 (15.1) | 550 | 618 (4.3) | 864 (6.0) | 6939 (47.9) |
| Kristalex 3070 | 100 | 1.7 | | 2334 (16.1) | 924 | 193 (1.3) | 262 (1.8) | 6944 (47.9) |
| Piccolastic A5 | 81.8 | −20.2 | 2.47E+06 | 66.3 (0.46) | 2500 | 62.7 (0.43) | 65.6 (0.45) | 111.1 (0.77) |
| Piccolastic A75 | 81.8 | −4.8 | 6.19E+06 | 2924 (20.2) | 723 | 352 (2.4) | 566 (3.9) | 9165 (63.2) |
| Regalite R101 | 100 | 1.9 | | 2111 (14.6) | 640 | 378 (2.6) | 585 (4.0) | 6358 (43.8) |
| Regalrez 3102 | 100 | 5.1 | | 2389 (16.5) | 528 | 664 (4.6) | 903 (6.2) | 7078 (48.8) |
| Foral 85 | 100 | 5.2 | | 1586 (10.9) | 853 | 137 (0.94) | 180 (1.2) | 4505 (31.1) |
| Kristalex 3070 | 100 | 1.4 | | 2168 (15.0) | 800 | 179 (1.2) | 235 (1.6) | 5683 (39.2) |
| Foral 105 | 100 | 7.4 | | 2028 (14.0) | 632 | 424 (2.9) | 545 (3.8) | 6724 (46.4) |
| Staybelite Ester 10 | 100 | 4.5 | | 2080 (14.3) | 995 | 113 (0.78) | 150 (1.0) | 5968 (41.2) |
| Eastotac H100E | 100 | 4.5 | | 1949 (13.4) | 583 | 460 (3.2) | 610 (4.2) | 6076 (41.9) |

Table Nine shows that a wide variety of tackifier structures can improve the tensile properties of substantially random interpolymers. Tackifiers from the rosin ester, wood rosin, pure monomer, $C_5$–$C_9$, aromatic modified $C_5$, partially hydrogenated $C_5$–$C_9$, and cycloaliphatic families have been shown to be effective. Of particular and unexpected note in Table Nine is that the combination of, for instance, 100 parts of tackifier with 100 parts of the substantially random interpolymer components results in materials having much higher tensile strengths than the substantially random interpolymer alone, preferably a maximum tensile strength of at least twice, more preferably at least three times as great as that of the substantially random interpolymer alone.

Glass Transition Temperature Adjustment for High Slyrene Content Polymers

A substantially random interpolymer of ethylene and styrene having from 73.7 to 74.9 weight percent styrene and a melt index ($I_2$) of 1 g/10 minutes, is melt blended with the indicated amount of Endex™ pure monomer resin, available from Hercules. The formulations tested, and the glass transition temperature of the resultant formulations, are set forth in the following Table Ten.

TABLE TEN

| Sample No. | Weight percent Substantially Random Interpolymer | Weight percent Tackifier | Glass Transition Temperature (° C.) |
|---|---|---|---|
| Comparative Ex. D | 100 | 0 | 22.1 |
| Ex. 24 | 90 | 10 | 23.6 |
| Ex. 25 | 80 | 20 | 25.6 |
| Ex. 26 | 70 | 30 | 27.7 |

The data set forth in Table Ten illustrates the use of a tackifier to raise the glass transition temperature of a high styrene containing interpolymer to levels above ambient temperature.

These and other embodiments will be readily ascertained by one skilled in the art. Accordingly, the subject invention is to be limited only by the following Claims.

What is claimed is:

1. A composition comprising from 5 to 95 weight percent of at least one substantially random interpolymer of ethylene and a vinylidene aromatic monomer or a hindered aliphatic vinylidene monomer and optionally at least one third monomer selected from the group consisting of $C_3$–$C_{20}$ α-olefins and norbornene wherein the substantially random interpolymer comprises at least 25 mole percent of the vinylidene aromatic monomer or hindered aliphatic vinylidene monomer, and from 5 to 95 weight percent of at least one tackifier.

2. The composition of claim 1, wherein the at least one substantially random interpolymer is an interpolymer of ethylene and a vinylidene aromatic monomer represented by the following formula:

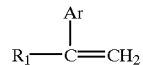

wherein $R_1$ is selected from the group of radicals consisting of hydrogen and alkyl radicals containing three carbons or less, and Ar is a phenyl group or a phenyl group substituted with from 1 to 5 substituents selected from the group consisting of halo, $C_{1-4}$ alkyl, and $C_{1-4}$ haloalkyl.

3. The composition of claim 1, wherein at least one of the substantially random interpolymer is an interpolymer of ethylene, a vinylidene aromatic monomer or a hindered aliphatic vinylidene monomer, and at least one third monomer selected from the group consisting of $C_3$–$C_{20}$ α-olefins and norbonene.

4. The composition of claim 1, wherein at least one of the substantially random interpolymers is an interpolymer of ethylene, a vinylidene aromatic monomer, and optionally at least one third monomer selected from the group consisting of $C_3$–$C_{20}$ α-olefins and norbonene.

5. The composition of claim 1, wherein the composition comprises from 25 to 95 weight percent of the substantially random interpolymer and from 5 to 75 weight percent of at least one tackifier.

6. The composition of claim 1, wherein the at least one tackifier is selected from the group consisting of wood rosin, tall oil derivatives, cyclopentadiene derivatives, natural and synthetic terpenes, terpene-phenolics, styrene/α-methyl styrene resins, and mixed aliphatic-aromatic tackifying resins.

7. The composition of claim 1, wherein the composition further comprises from 5 to 75 weight percent of at least one modifying or extending composition selected from the group consisting of paraffinic waxes, crystalline polyethylene waxes, ultralow molecular weight ethylene polymers, homogeneous linear or substantially linear ethylene/α-olefin interpolymers, polystyrene, styrene block copolymers, ethylene vinyl acetate copolymers, and amorphous polyolefins.

8. The composition of claim 1, wherein the composition comprises from 1 to 60 weight percent of one or more processing aids selected from the group consisting of phthalate esters, natural oils, paraffinic oils, naphthenic oils, and aromatic oils.

9. The composition of claim 1, wherein the α-olefin monomer is propylene, butene-1, 4-methyl-1-pentene, hexene-1, or octene.

* * * * *